United States Patent [19]

Kumar

[11] Patent Number: 5,754,861
[45] Date of Patent: May 19, 1998

[54] DYNAMIC PROGRAM INPUT/OUTPUT DETERMINATION

[75] Inventor: Anita Kumar, Austin, Tex.

[73] Assignee: Motorola, Inc., Schaumburg, Ill.

[21] Appl. No.: 515,730

[22] Filed: Aug. 16, 1995

[51] Int. Cl.⁶ .................................................. G06F 11/34
[52] U.S. Cl. ............................................................ 395/704
[58] Field of Search .............................................. 395/704

[56] References Cited

U.S. PATENT DOCUMENTS

| | | | |
|---|---|---|---|
| 5,355,487 | 10/1994 | Keller | 395/704 |
| 5,418,941 | 5/1995 | Peters | 395/704 |
| 5,450,586 | 9/1995 | Kuzara et al. | 395/704 |
| 5,594,904 | 1/1997 | Linnermark et al. | 395/704 |

*Primary Examiner*—Emanuel Todd Voeltz
*Assistant Examiner*—John Q. Chavis

[57] ABSTRACT

A computer program's run-time inputs and outputs are dynamically, non-intrusively, and executable-independently determined by wrapping a "Wrapper" around the computer program. The "Wrapper" turns on system traces (102), executes the computer program (104), and turns off the system traces (106). It then reads and evaluates the traces (108), identifying process and file information corresponding to the recent execution of the computer program (104). This process and file information is collected and written to a Run History data base (310).

30 Claims, 9 Drawing Sheets

DYNAMIC PROGRAM INPUT/OUTPUT DETERMINATION

CROSS REFERENCE TO RELATED APPLICATION

This application is related to our copending patent application entitled FILE CONFIGURATION AUDIT SYSTEM, filed of even date herewith and assigned to the assignee hereof.

FIELD OF THE INVENTION

The present invention generally relates to production control software, and more specifically to identifying and recording computer program inputs and outputs.

BACKGROUND OF THE INVENTION

A deterministic program's run time course is determined by its inputs: its environment variables, command line parameters, and input files. Identification and recording of these input stimuli along with the corresponding output responses in a run history file at run time can be useful when determining which programs have been run with which inputs.

The traditional solution to this problem required that the run history information be entered manually. The 1970 Decennial Census required an entire branch of clerks to keep track of the Census input and output files. This approach has all of the disadvantages of manual operations: it is slow, labor intensive, and inaccurate.

Another alternative is to incorporate code in each program that automatically records the information for each run of each program. This works very well in situations where source code is available to be modified. Unfortunately, it does not work in situations where source code is unavailable. Source code is rarely available for programs licensed from third parties. This approach also requires remodification and recompilation whenever changes are made to the base code. This too can cause significant problems.

A somewhat similar approach is the use of custom bill-of-materials generators. Each custom bill-of-materials generator relies on knowledge about its associated program to function. This again requires at least read access to the source code of the associated program and has the disadvantage of potentially being out of sync with its associated program due to a bug in the update of the program.

There is a significant need for an automated system to determine and record in a run history data base a program's inputs and outputs. This automated system needs to operate without knowledge of the internals of the program, allowing its use with 3rd party software.

SUMMARY OF THE INVENTION

In accordance with the invention, a computer program's run-time inputs and outputs are dynamically, non-intrusively, and executable-independently determined by wrapping a "Wrapper" around the computer program. The "Wrapper" turns on system traces, executes the computer program, and turns off the system traces. It then reads and evaluates the traces, identifying process and file information corresponding to the recent execution of the computer program. This process and file information is collected and written to a Run History data base.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF A PREFERRED EMBODIMENT

At one time, complex integrated circuits designs, such as those for microprocessors, were developed in a serial fashion: one model of the chip evolved over time. But in order to achieve cycle time objectives in today's competitive environment, different models of a chip must co-exist and evolve concurrently, until the various models can be integrated and tested.

In addition to the ability to build totally separate designs in parallel, it is also extremely helpful to be able to have multiple people working on the same design in parallel. One example of this is the instance where one designer finishes a version of his portion of an Integrated Circuit ("IC") and sends the version out for testing. He then makes modifications to that version. At that point, the version that the designer is working on is different from the version being used by the tester.

The coordination of these various versions can become very complex. Yet it is essential to validate that all of the appropriate tests have been applied to the appropriate versions of a design before the design is used in the production of the Integrated Circuit (IC).

Figure 1:
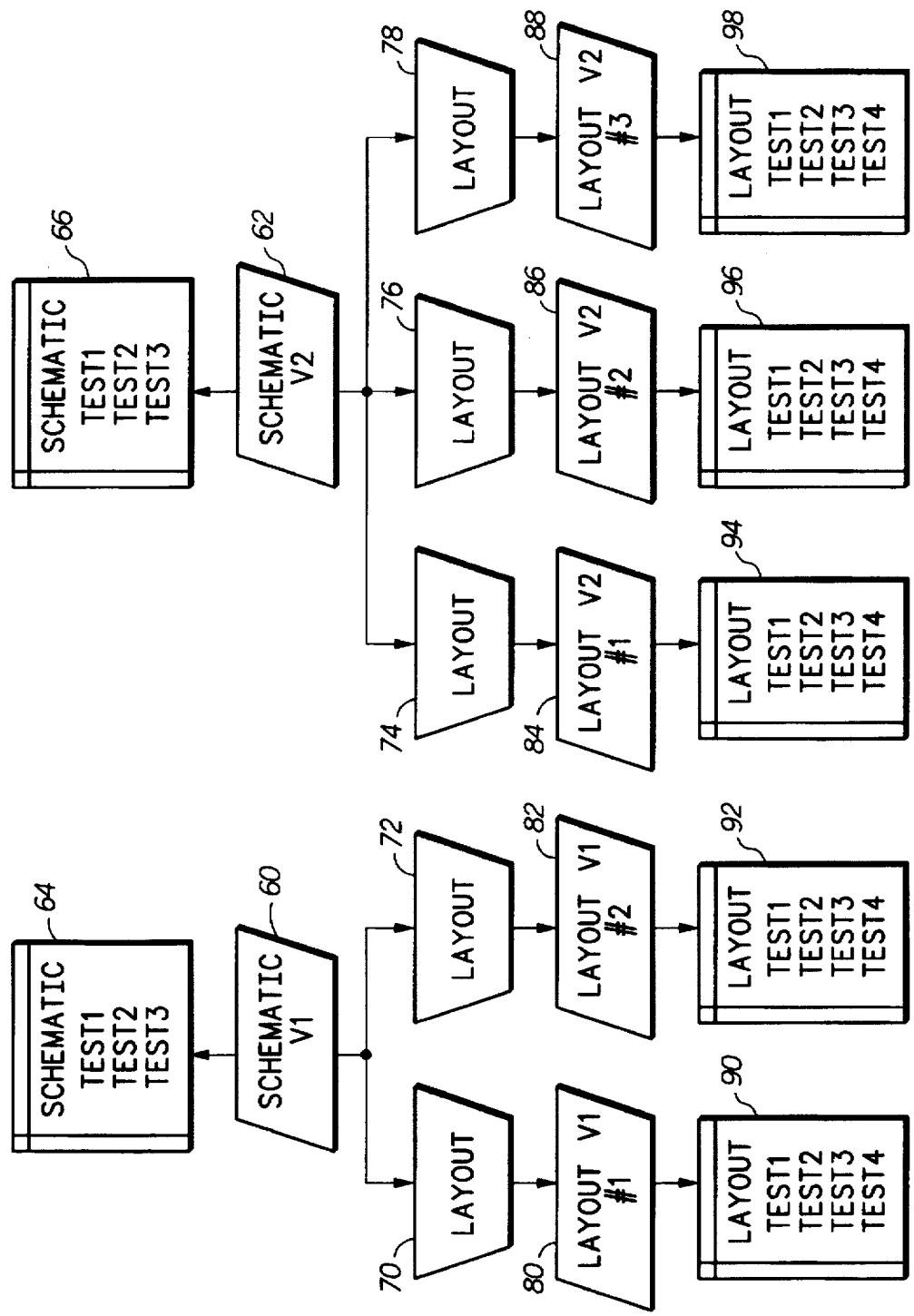
FIG. 1 is a block diagram illustrating the problems addressed by this invention.

FIG. 1 is a block diagram illustrating the problems addressed by this invention. Two circuit schematics are shown: V1 60, and V2 62. Each of these circuit schematics 60, 62 must be run through a set of tests 64, 66 to prove their correctness. From each of the schematics 60, 62, multiple circuit layouts are created 70, 72, 74, 76, 78. Schematic V1 60 is first laid out 70 as layout V1#1 80, then laid out 72 as layout V1#2 82. Likewise circuit schematic V2 62 is laid out first 74 as layout V2#1 84, next 76 as layout V2#2 86, and finally laid out 78 as V2#3 88. Each of the layouts 80, 82, 84, 86, 88, must also be run through a set series of tests 90, 92, 94, 96, 98.

Before a given layout can be used in the production of Integrated Circuits (IC), it must be shown that the layout is correct. This requires that:

1) The schematic be shown correct,
2) The layout be shown correct, and
3) The schematic be shown to match the layout.

For example, in order to utilize layout V1#1 80 in FIG. 1 in the construction an IC, layout V1#1 80 should be verified by:

1) showing that schematic V1 60 has been successfully run against all of the tests in schematic test suite 64,
2) showing that layout V1#1 80 has been successfully run against all of the tests in layout test suite 90, and
3) showing that schematic V1 60 is electrically equivalent to layout V1#1 80.

One problem that occurs with great regularity in this type of environment is where not all tests will be rerun after a change is made. For example, suppose that layout V1#1 80 is made from schematic V1 60. Tests are then begun 90 on layout V1#1 80. Meanwhile, schematic V1 60 is slightly modified, resulting in schematic V2 62. Schematic V2 62 passes all of its tests 66, as does 90 layout V1#1 80. But note that layout V1#1 80 does not match schematic V2 62. At this point, we cannot certify that layout V1#1 80 is correct and usable, since it doesn't match a tested schematic (V2 62).

The design of a single Integrated Circuit (IC) chip these days requires many more files than the two schematic files and five layout files shown in FIG. 1. These files include schematic and layout files starting with small components, and working up to files describing and defining the entire chip. Keeping track of all of these files in a complex Integrated Circuit (IC) design, and verifying that they all match and have been properly tested in a parallel design environment can be very complicated. This is especially true for the design of full sized processors which may require upwards of a thousand different files per design. Yet the cost of not verifying is becoming prohibitive. This has a significant effect on both time to market and product reliability.

Figure 2:
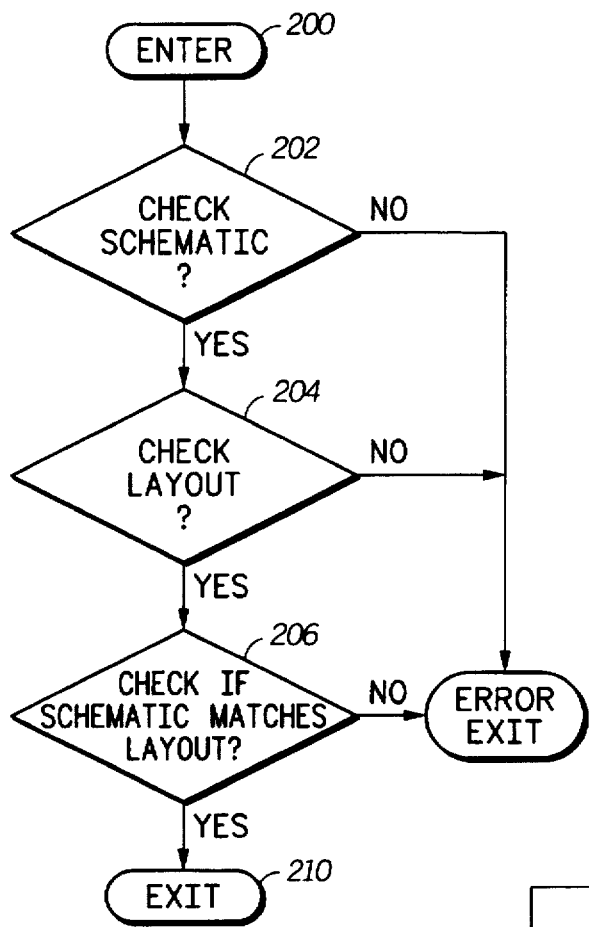
FIGS. 2–5 are flowcharts showing the operation of one implementation of the Validity Checker, in accordance with one embodiment of the present invention.

FIG. 2 is a flowchart showing the operation of one implementation of the validity checker. The checker is entered, step 200, and the Schematic is verified, step 202. Next, the Layout is verified, step 204, and the schematic is checked for electrical identity with the layout, step 206. If any of these checks fail, the validity check error exits. Otherwise, it normal exits, step 210, indicating that the layout is correct.

Figure 3:
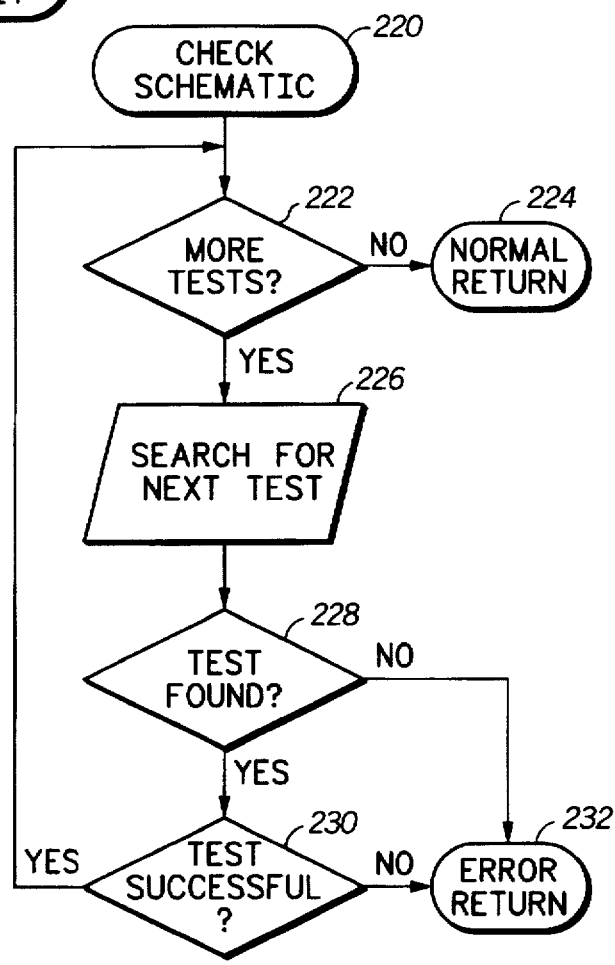

FIG. 3 is a flowchart showing the operation of the Check Schematic routine, step 220 in FIG. 2. The routine enters, step 220 and a check is made for more tests, step 222. If there are no more tests to run, the routine returns normally, step 224, indicating success. Otherwise, a search is made for the next test to verify, test 226. If the test is found not to have been run, step 228, the routine error returns, step 232. Otherwise, a check is made whether the test was successful, step 230. If the test was not successfully run, step 230, which may be indicated by a nonzero result or status code, the routine error exits, step 232. Otherwise, the routine loops, again checking for more tests to verify, step 222.

Figures 4, 5:
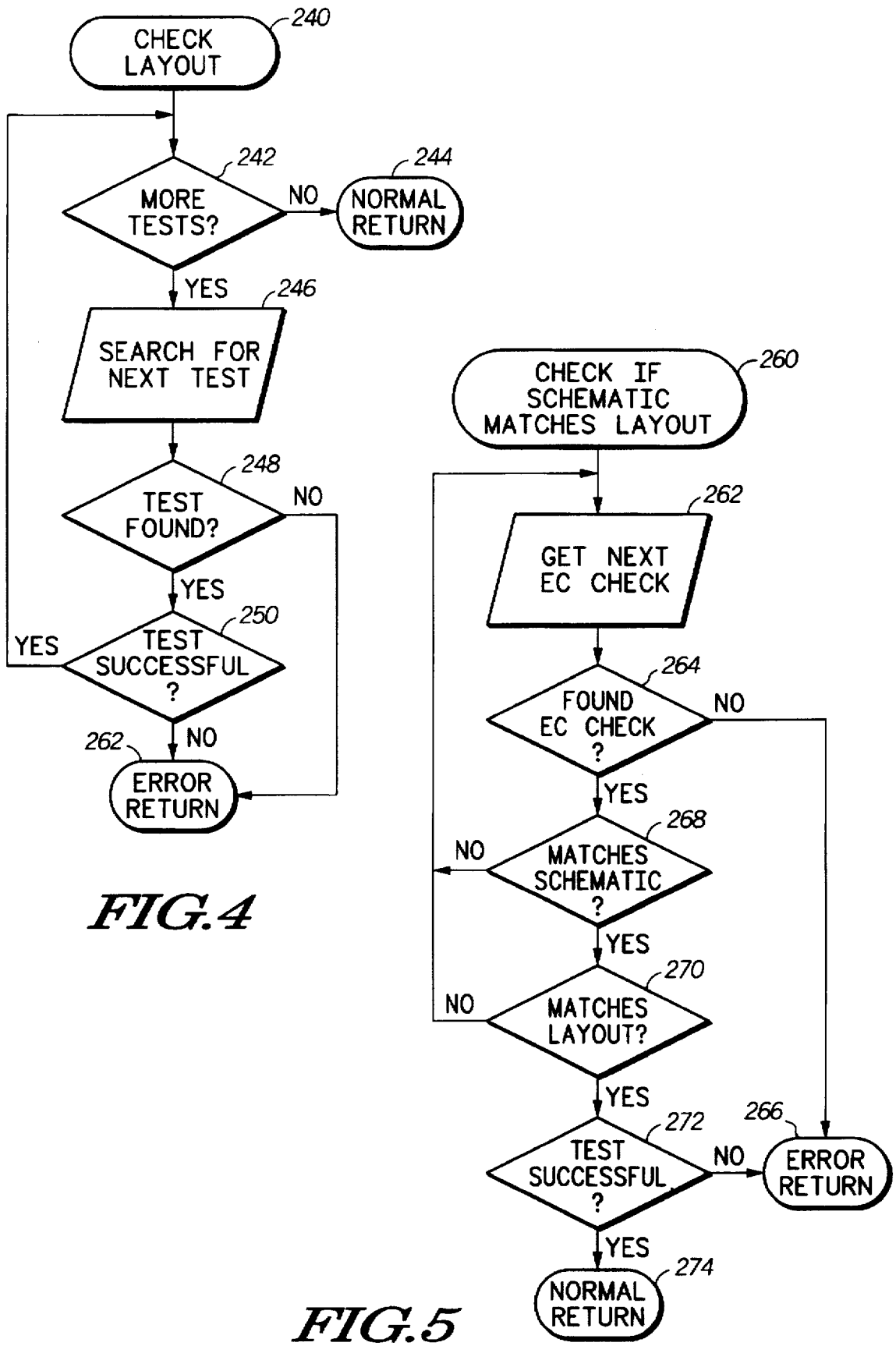

FIG. 4 is a flowchart showing the operation of the Check Layout routine, step 204 in FIG. 2. The routine enters, step 240 and a check is made for more tests, step 242. If there are no more tests to run, step 242, the routine returns normally, step 244, indicating success. Otherwise, a search is made for the next test to verify, test 246. If the test is found not have to been run, step 248, the routine error returns, step 252. Otherwise, a check is made whether the test was successful, step 250. If the test was not successfully run, step 250, which may be indicated by a nonzero result or status code, the routine error exits, step 252. Otherwise, the routine loops, again checking for more tests to verify, step 242.

FIG. 5 is a flowchart showing the operation of the Check If Schematic Matches Layout routine, step 206 in FIG. 2. The routine enters, step 260 and gets the next Electrical Checker (EC) tests, step 262. If there are no more tests that have been run, step 264, the routine returns, step 266, indicating failure. Otherwise, the EC test is checked to see if it tested the required schematic, step 268, and layout, step 270. If they don't match, the routine loops, getting the next EC test to check, step 262. If it matches both the schematic, step 268, and the layout, step 270, a check is then made whether the Electrical Checker was successful, step 272. If it was successful, the routine returns normally, step 274, indicating that the layout and schematic match. Otherwise, the routine error exits, step 266, indicating failure.

One alternative to the above Check If Schematic Matches Layout routine, step 206 in FIG. 2 is to loop upon failure in step 272 back to step 262, instead of error exiting, step 266. This change allows multiple Electrical Checker runs over the same layout/schematic pair.

Figure 6:
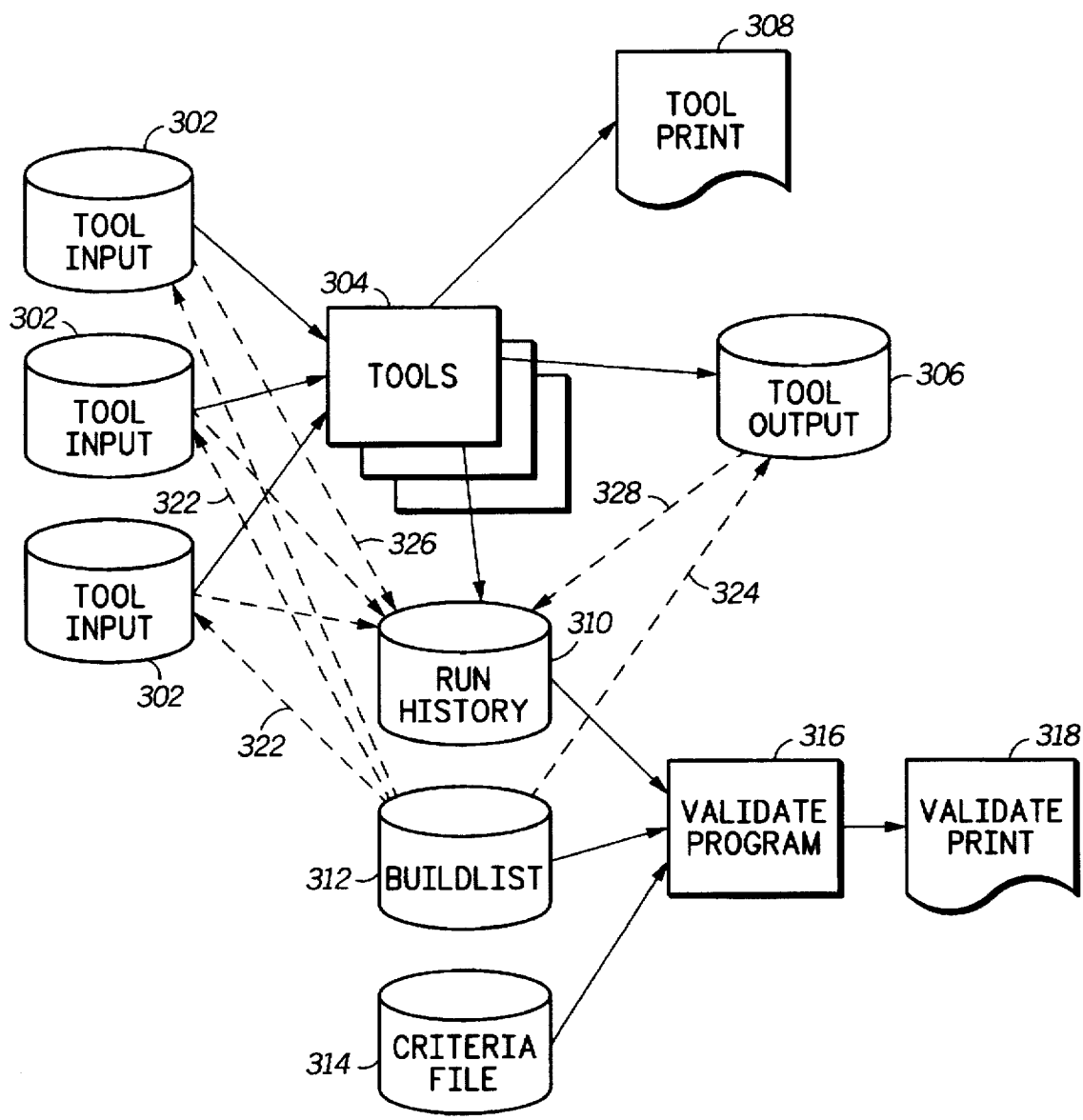
FIG. 6 is a block diagram showing the components in a more general implementation of the Validity Checker, in accordance with one embodiment of the present invention.

FIG. 6 is a block diagram showing the interaction of the most significant components in a more general implementation of the Validity Checker or Audit Engine system. It would be more suitable for larger designs, such as are found in high performance microprocessor development efforts or large team software development projects.

The Validity Checker has three main input files, a Run History File 310, a Buildlist File 312, and a Criteria File 314. The Run History File 312 contains information about each of the Tool Runs 304 executed. It includes identification of the Input Tool Files 302, status from the Tool Runs 304, and possibly identification of the output file 306 generated by the Tool 304. In the example shown in FIG. 1, the Run History File 312 would include the results from the Schematic tests 64, 68, the Layout tests 90, 92, 94, 96, 98, and any tests performed to show electrical identity or equivalence between Schematics 60, 62 and the corresponding Layouts 80, 82, 84, 86, 88. In the case of the files for a specific Schematic or Layout, for example Layout V1#1 80, there would be a separate history entry for each test run 90, i.e. TEST1, TEST2, TEST3, and TEST4.

The Buildlist File 312 is a file that contains information identifying the files contained in an Environment. It identifies Tool Input Files 302, and possibly some Tool Output Files 308. In the FIG. 1 example, one environment would include Schematic V1 60 and Layout V1#1 80. A second environment would include Schematic V1 60 and Layout V1#2 82.

The Criteria File 314 contains the Criteria that a Validate Program 316 uses to evaluate the files in the Environment in the Buildlist 312 against the results of tool runs in the Run History File 314. The Validate Program or Audit Engine 316 applies the Criteria to the files in the Buildlist environment, and generates output 318. This Validate Program output 318 can contain warnings and error messages describing which tests have been executed successfully and unsuccessfully, and which tests have not been run.

The Attachment includes an example of these files. It consists of a sample Buildlist File 312, Criteria File 314, and Run History File 310, and Print output 318 from execution of the Validate Program or Audit Engine 316 utilizing the three input files 310, 312, 314 in the Attachment. It should be noted that an actual Buildlist File 314 for the current generation of RISC processor chips may identify upwards of a thousand Tool Input Files 302 and the Run History File 310 may contain information for hundreds, if not thousands of Tool 304 runs.

Figure 7:
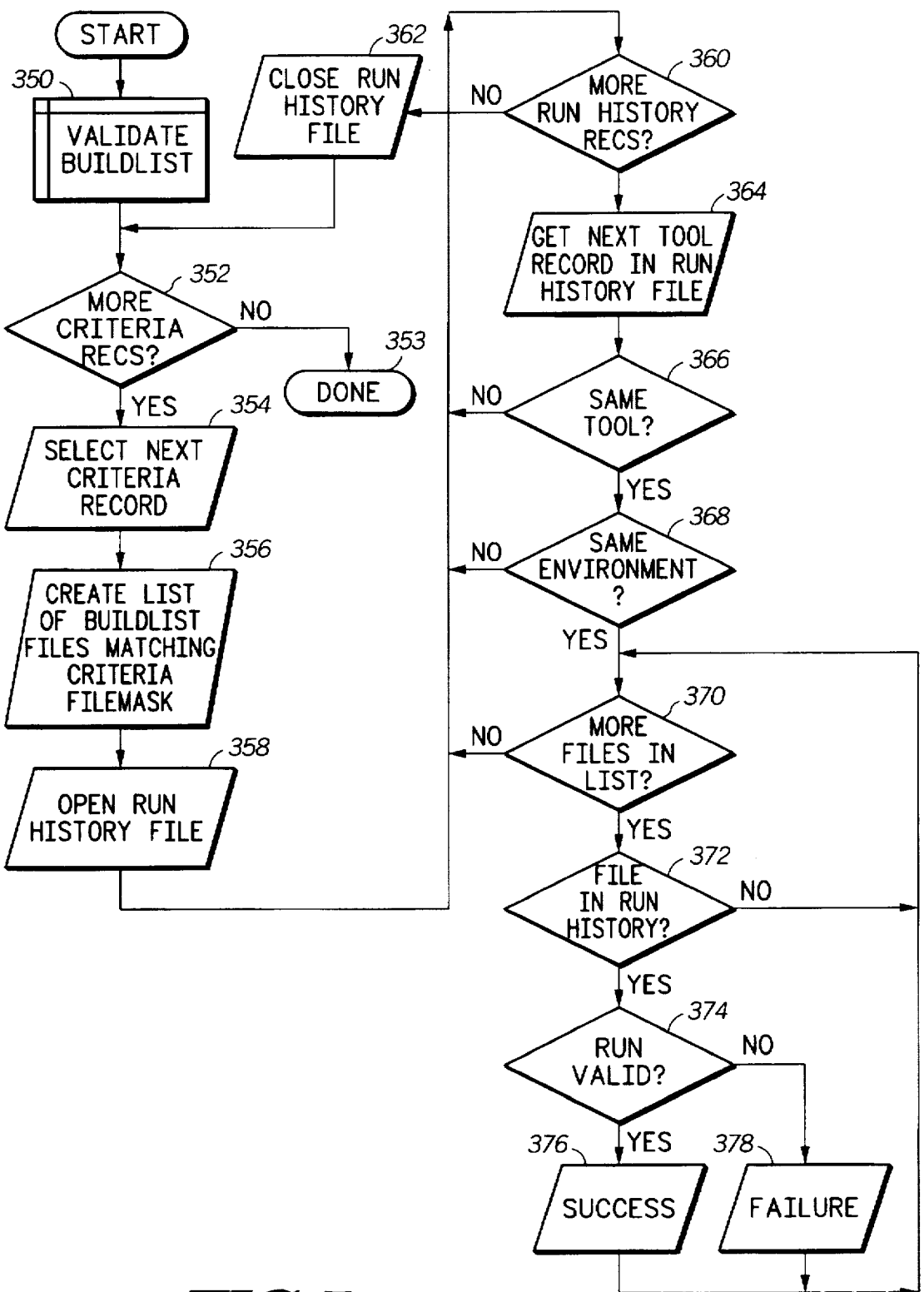
FIG. 7 is a flowchart showing the operation of the preferred embodiment shown in FIG. 6.

FIG. 7 is a flowchart showing the operation of the preferred embodiment shown in FIG. 6. The first operation is to validate the Buildlist 350. In order to be valid, a Buildlist 312 must not include any duplicate copies or versions of the same file. Different versions may be uniquely identified by some filename mask, through use of a version-control system, or through use of checksums. The latter is shown in the Attachment by the use of the "aprsum" program. In the example shown in FIG. 1, Layout V1#1 80 and Layout V1#2 82 could not validly reside in the same Buildlist 312, nor could Schematic V1 60 and Schematic V2 62.

Next, the Criteria Records in the Criteria File 314 are sequentially read and evaluated. In the Criteria File 314 shown in the Attachment, each Criteria Record is identified by the keyword "CRITERIA" followed by the code contained between a matched set of opening ("{") and closing ("}") braces. The primary statements in each criteria record are: FILE_PATTERNs, RUN_REQs, and FILE_REQs. The FILE_PATTERN statements identify File Patterns that match files in the Buildlist 312. In the example shown in the Attachment, the first Criteria Record is the DEVICE criteria:

FILE_PATTERN "DEVICE/.*"

It is matched by a "DEVICE/.*" regular expression in a filename. For example, this FILE_PATTERN will match "data/dir3/DEVICE/nmos" in the Buildlist 314 shown in the Attachment.

Following FILE_PATTERN statements in Criteria Records are RUN_REQS statements. These are named and include the statements contained within a matched set of opening ("{") and closing ("}") braces. The RUN_REQS statements contain RUN_PATTERN and VALID_RUN statements. The RUN_PATTERN statements identify processor calls. These are the tool programs used to make or test portions of the environment. In the Attachment example, the first pattern:

RUN_PATTERN "lp:.*"

matches History Records in the Run History File 310 that have a processor call or tool program name that match the regular expression "lp:.*". This mask matches the processor call in the third entry in the Run History File 310 in the Attachment example (which starts "lp:/tmp_mnt/home/anitak/. . ."). The VALID_RUN statement determines whether the RUN_REQS statement returns a Boolean true or false. A valid run is identified in the Attachment first example by:

VALID_RUN(ExitStatus@=0 || Waiver~".*")

Thus, the example RUN_REQS statement returns true if either the ExitStatus was zero, OR a Waiver card was present. The "@" in the equation directs that a Warning be printed if that test fails, even if the entire statement is true.

The example above and in the Attached example show testing ExitStatus against zero. This was done solely for simplicity. Much more complex testing is also available. Compound conditionals are supported, and multiple tests can be required for a successful configuration. Also, as noted below, the invention is not limited to ExitStatus. For example, a tool program may attach the number of shorts (#shorts is the number of times power is connected to ground) to its Run History entry. The #shorts in the history record might then be tested, requiring there to be five or less shorts for a valid run.

The final statement in the Criteria Record is the FILE_REQS statement. In the first criteria record in the Attachment example validity requires that:

FILE_REQS(lp || exclusion)

Thus, a run/file combination is valid if either the "lp" VALID_RUN returned true, or the "exclusion" VALID_RUN did.

Continuing with FIG. 7, if more criteria records exist in the Criteria File 310, step 352, the next Criteria Record is read and interpreted. A list of all the files matching the criteria filemask in the buildfile is created, step 356. In the Attachment example, the list for the DEVICE CRITERIA would include:

data/dir3/DEVICE/MMAA aprsum 58912
data/dir3/DEVICE/nmos aprsum 29137
data/dir3/DEVICE/pmos aprsum 28929
data/dir3/DEVICE/rpmos aprsum 29222
data/dir4/DEVICE/WID0 aprsum 137648
data/dir4/DEVICE/WID1 aprsum 338482
data/dir4/DEVICE/WID2 aprsum 192228
data/dir4/DEVICE/WID3 aprsum 56049
data/dir4/DEVICE/WID4 aprsum 537590
data/dir4/DEVICE/WID5 aprsum 796952
data/dir4/DEVICE/WID9 aprsum 143466
data/dir4/DEVICE/WIDA aprsum 1245861

Next, the Run History File 310 is opened, step 358. The run history records are read one-by-one. A check is made whether there are any more Run History Records in the Run History File 310, step 360. In the Attachment example, Run History Records are separated by "* * *" cards. If not, the program loops back, closing the Run History File 310, step 362, and checking for more Criteria Records, step 352. Otherwise, the next Run History record is read from the Run History File 310, step 364.

The tool entry in the Run History Record is compared with the tool in the Criteria Record, step 366. In the Attachment example, the third Run History Record matches the RUN_PATTERN ("lp") in the first RUN_REQS in the first CRITERIA Record. If the Tool in this Run History Record does not match the Criteria Record Tool, step 366, the program loops, checking for more Run History Records, step 360.

If the same tool, step 366, a check is made whether the Run History Environment matches the Buildlist Environment, step 368. This can be done by comparing the files in the Run History Record with the files in the Buildlist File List built in step 356. Note that in the Attachment example, the Run History file list is located between a "* *" delimiter and the "* * *" delimiter card discussed above. If not the same Environment, step 368, the program loops, checking for more Run History Records, step 360. One obvious optimization here would be to check each Run History Record one time against the Buildlist 312 environment, eliminating further consideration of those Run History Records with differing Environments.

After determining that the Run History Environment matches the Buildlist Environment, step 368, an inner loop is entered where the files in the Buildlist List created in step 356 are evaluated one-by-one. A check is made whether there are any more files in the list, step 370. If not, the inner loop is complete, and the intermediate loop is repeated, with a check for more Run History Records, step 360.

If there are more files in the Buildlist list, step 370, a check is made whether the next file in the Buildlist list is in the Run History file list, step 372. If the file is not in the Run History file list, step 372, the inner loop iterates, checking for more files in the list, step 372. Otherwise, a check is made whether the run was valid, step 374. If the run was valid, step 374, a success message is printed in the Validate Print 318 file, step 376. Otherwise, a failure message is printed, step 378. In either case, the inner loop iterates, again checking for more files in the Buildlist file list, step 370.

In the Attached example, determination of whether a run was valid for a particular file, step 374, is determined first by the VALID_RUN statements in the CRITERIA statements. One example is to check for a run's exit status. There are two RUN_REQS statements in the DEVICE CRITERIA record. In the first such statement, a check is made of ExitStatus. Looking at the Attachment example Run History File 310, the first two Run History Records contain an ExitStatus equal to zero, while the third record (the first record matching the "lp" tool) contains an ExitStatus equal to 20.

Different implementations of the above procedure are envisioned. For example the loops may be embedded in different orders. One such enhancement would read Run History File 310 records one-by-one. Each Run History record would be checked against the Buildlist File 312 Environment. If they both are for the same environment, the Criteria File 314 records can be read one-by-one. Each file in the Run History could then be checked against the Criteria File 314 record.

Other implementations are also envisioned. One extension is the support of labeled substrings in the regular expression matching. Thus, when a match is made, the matched filename can be easily split into different substrings. This would allow construction of other filenames on-the-fly from the labeled substrings. The presence of these additional filenames could then be verified in the Run History File 310 records. One usage of this feature is to easily verify that layouts match schematics in an environment that contains multiple distinct layouts and/or schematics.

Another extension is to provide criteria for determining whether an entire design is valid, based on a given Run History 310, Buildlist 312, and Criteria File 314. The primary feature required would be provision of additional levels of Criteria. For example, CRITERIA records could invoke or reference CRITERIA records in addition to RUN_REQS statements. An additional feature that would simplify this would be parameterization of Criteria statement calls and statements. This would be especially helpful if combined with the labeled substring facility discussed in the previous paragraph.

The Validate Program or Audit Engine is useful for managing data in concurrent engineering environments where more than one model of a system is being evolved at any given time. An example would be a microprocessor development team, where time-to-market pressures force operations that would otherwise be done sequentially to happen in parallel. For example, static timing analysis may be performed on one configuration of a device, while functional regression testing is occurring on another configuration of the chip. Using this configuration management system, the status of a view (i.e. file), or a group of views, can be checked and validated.

The remainder of this disclosure discusses a method of recording entries in a Run History File 310. One solution is to manually enter the information from each tool run in a Run History File 310. This has all of the disadvantages of manual operations in the computer age: it is labor intensive, and error-prone.

Another alternative is to incorporate code in each Tool 304 that automatically records the information for each Tool run. This is often not practicable since Tools 304 are often purchased from Tool vendors, and such inclusion would involve modification of Tool source code, which Tool vendors are often reluctant to allow. Note that this is compounded because a large development project often uses tools from a number of different vendors.

A third alternative is usage of a custom bill-of-material generator which relies on knowledge about its associated program to operate. A different custom bill-of-material is required for each Tool whose run-time configuration needs to be recorded. This alternative also requires access to source code. Another disadvantage is that the generator can get out-of-sync with its associated tool program, introducing the possibility of errors.

A preferred alternative is to automatically generate the information from system logs or traces. FIGS. 8–12 are flowcharts that together illustrate a UNIX implementation of this alternative. Some version of UNIX is standard on almost all engineering workstations.

Figure 8:
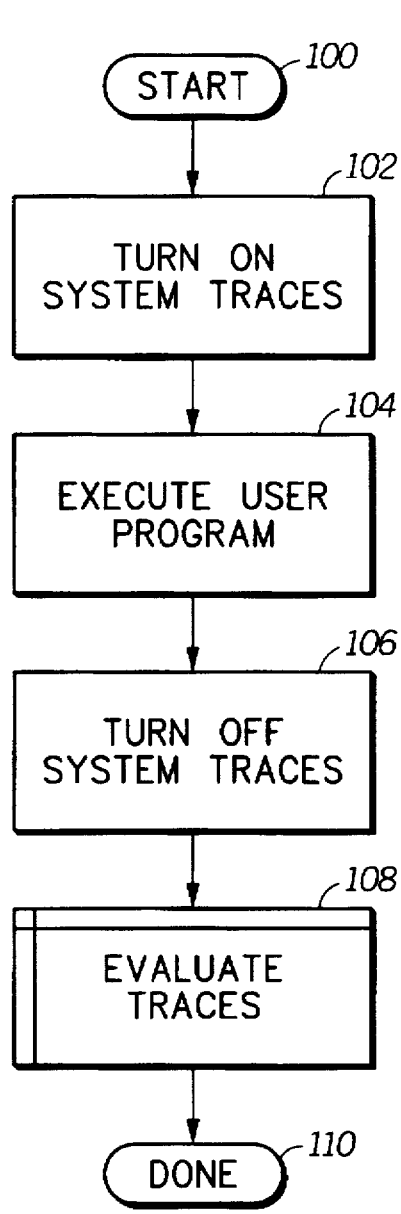
FIGS. 8–12 are flowcharts showing the operation of a UNIX implementation of the Automatic Run History Generator, in accordance with the present invention.

The implementation shown in FIG. 8 can best be understood as wrapping a "wrapper" around the execution of each Tool 304. This is done by placing the pathname to the Tool 304 program and command line parameters as arguments or inputs to the "wrapper" program.

The "wrapper" program starts, step 100, by turning on system traces, step 102. The user program is then executed, step 104. This is typically done in UNIX with FORK and, EXEC system calls. Upon completion of the program, step 104, the system traces are turned off, step 106, the trace file is processed, step 108, and the program exits, step 110.

The "wrapper" function was implemented under IBM's AIX UNIX operating system utilizing its "trace" facility. Function "trcon" was invoked to turn traces on and function "trcoff" invoked to turn traces off. More recently, equivalent AIX functionality has been offered in "SCTrace", a product offering of SEVone Software, a subsidiary of The Kernel Group, Inc. Note also that the Sun Solaris "strace" function provides similar functionality for that operating system.

Figure 9:
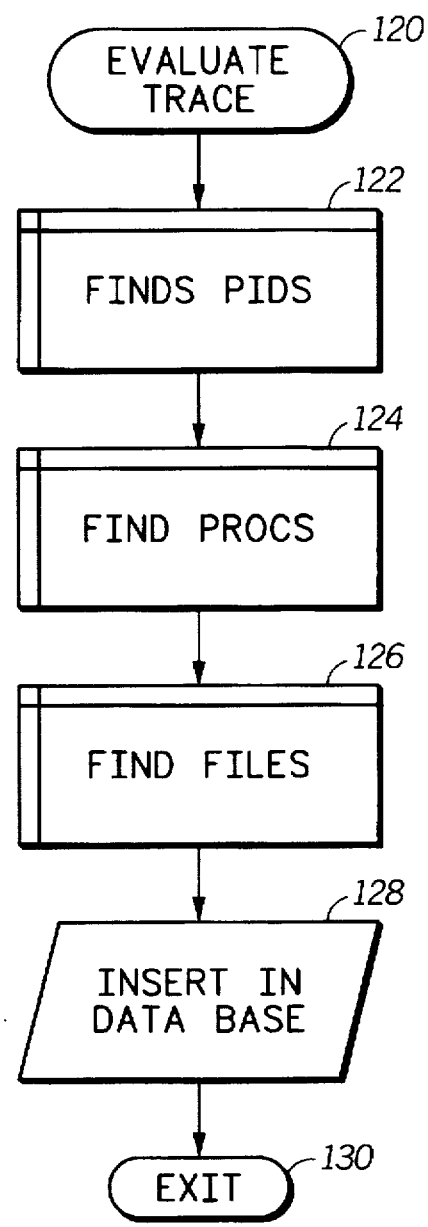

FIG. 9 is a flowchart showing the operation of an implementation of the Evaluate Traces routine, step 108, discussed in FIG. 8. It starts, step 120, by finding the Process Ids (PIDs) of the Tool program and its progeny, step 122. Next, corresponding program executions for the PIDs are identified, step 124. Program pathnames and return status's are written to the Run History File 310. Additionally, tool programs using API calls can attach other properties to its run-history entry (e.g. #shorts=5, #warnings=2). These additional properties can also be tested using Criteria Records. Next, the files belonging to the PIDs are identified, step 126, and all of the above is added to the Run History File 310 record. Finally, the wrapper exits, step 130.

Figures 10, 11:
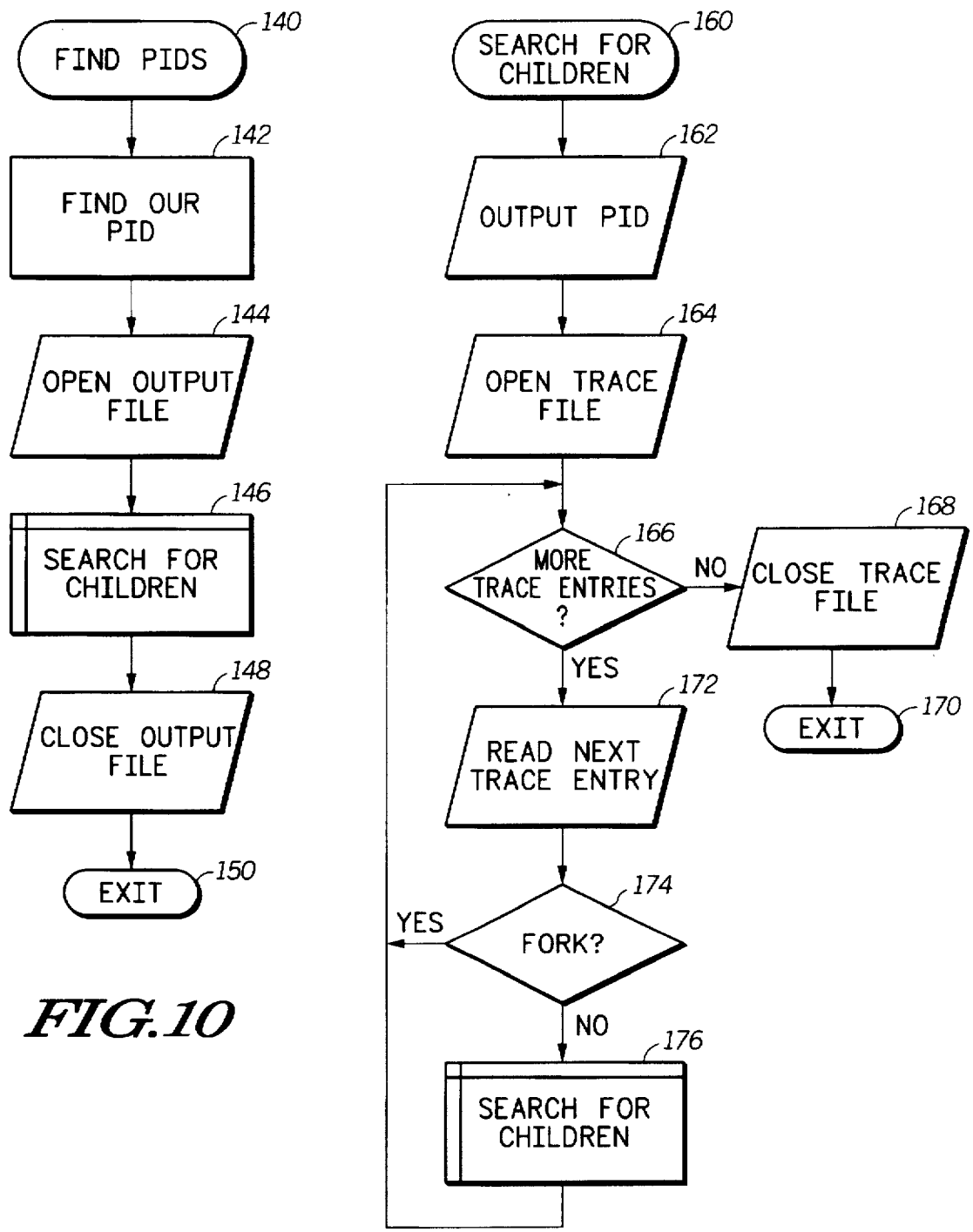

FIG. 10 is a flowchart showing the operation of an implementation of the Find PIDs routine, step 122. The routine enters, step 140, and determines the program's PID, step 142. Alternatively, the program can begin with the Tool's PID. The "wrapper's" PID can be easily determined through system calls. The Tool PID is often returned by FORK system calls, as was done to start the Tool program. In any case, a file is opened to store the PIDs, step 144, a search is made for Children PIDs, step 146, the output file is closed, step 148, and the routine returns, step 150. Instead of storing PIDs in a file, they can be stored in memory.

FIG. 11 is a flowchart showing the operation of an implementation of the Search For Children routine, step 146 in FIG. 10. The routine enters, step 160, and outputs the parent's PID, step 162. Note that the PID may be stored in either an output file, or memory. The Trace File is opened, step 164. The trace file entries are searched one-by-one. A test is made for more Trace File entries, step 166. If none exist, the Trace File is closed, step 168, and the routine returns, step 170.

If more Trace File entries exist, step 166, the next Trace File entry is read, step 172. If it is a FORK entry, step 174, the Search for children routine, step 146, is invoked recursively, step 176, with the PID from the FORK trace entry used as the PID in new invocation of the Search For Children routine. In any case, the routine loops, checking for more Trace File entries, step 166. The result of executing the Find PIDs routine, step 122, shown in FIG. 10, and the Search for Children routine, step 146, 176, shown in FIG. 11, is a list of relevant PIDs located either in a file or memory.

Figure 12:
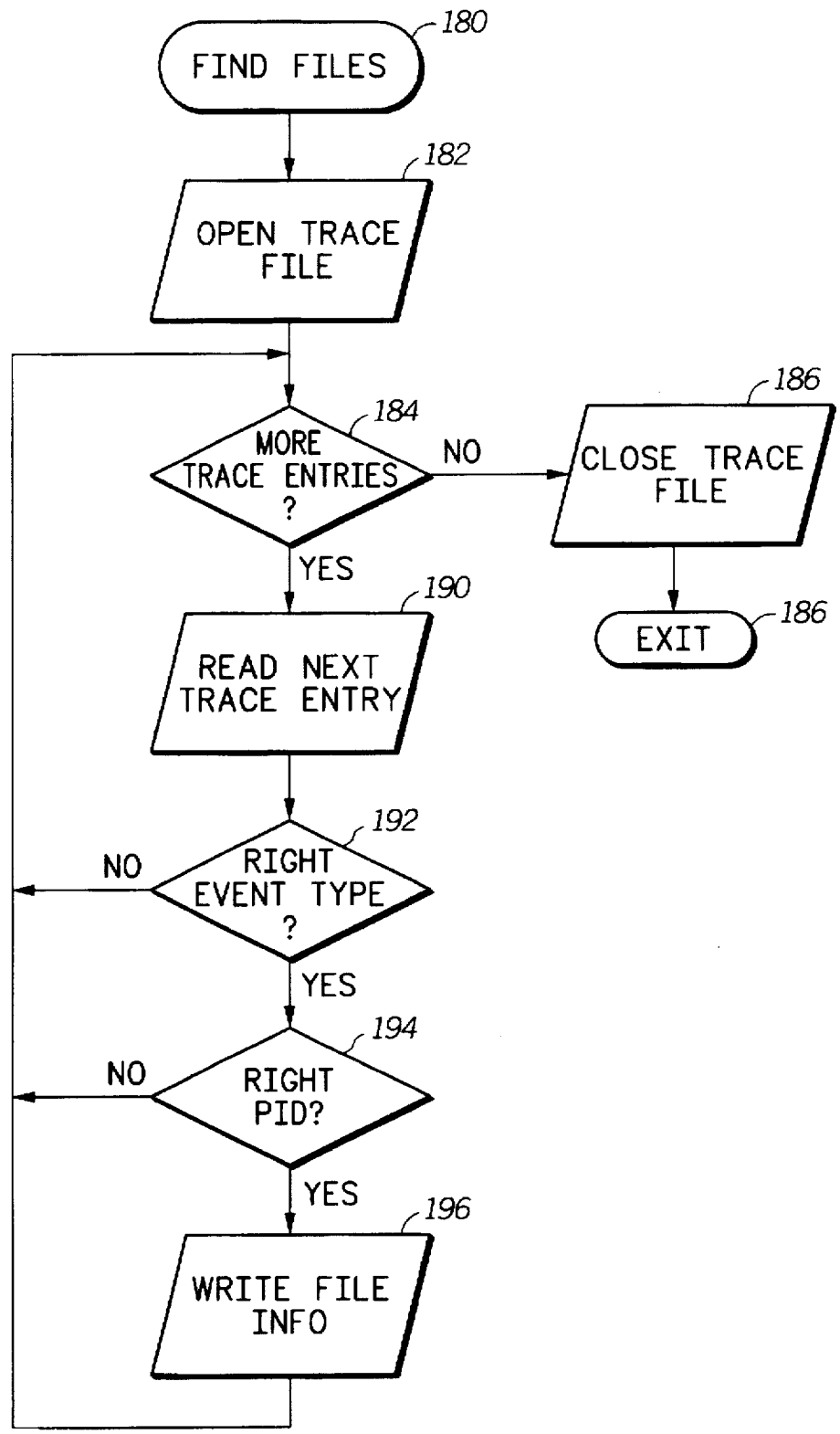

FIG. 12 is a flowchart of the operation of the Find Files routine, step 126 in FIG. 9. Its primary purpose is to identify all of the files associated with any one of the PIDs in the PID list created by the Find PIDs routine, step 122.

The Find Files routine starts, step 180, by opening the Trace File, step 182. Each entry in the file is read and evaluated, one-by-one. A Trace Entry loop is entered, and a check is made for More Trace Entries, step 184. If no more entries are found, the Trace File is closed.

If there are more Trace Entries, step 184, the next Trace Entry is read, step 190. The event type or code of the just-read Trace Entry is checked, step 192, and if not the correct type, the routine loops, checking for more Trace Entries, step 184. The "fopen" event type can be used here to identify the opening of files. Otherwise a check is made whether the PID of the Trace Entry matches the PID of any of the PIDs in the saved PID list, step 194. If the PID is in the list, step 194, the pathname is written to the Run History File 310. Often access privileges can be determined from Trace Entries, and these can also be written to the Run History File 310.

For efficiency, not all Trace types need to be enabled. Tracing only those events immediately applicable to the determination of PIDs, files opened or closed, and processor status adds a negligible amount of overhead to the tool execution. On an IBM RS/6000 workstation running under the AIX operating system, by turning on only traces 001, 106, 107, 130, 134, 139, 15b, the "wrapper" overhead was barely noticeable.

As noted above, different computer architectures require slightly different implementations. For example, under Mainframe operating systems, such as IBM's MVS/ESA and Unisys's OS/1100, the relevant information needed for the Run History File 310 can be acquired by reading the system log files searching for a unique JOBID or RUNID. As these operating systems do not FORK semiautonomous processes, step 124 with its associated detail in FIGS. 10–11 is not necessary.

Aside from such factors as disk space, a program's run-time course is affected by environment variable settings, command line parameter settings, and the content of the files read by the program. Determining and recording environment variables and command line parameter settings at run-time can be obtained automatically using this invention without additional knowledge about the program executable, or by altering the executable in any way.

It is useful to any application that requires input about the run-time configuration of a process. An example would be the above described configuration audit system that checks whether or not a particular file configuration has been examined by one or more verification programs.

Figure 13:
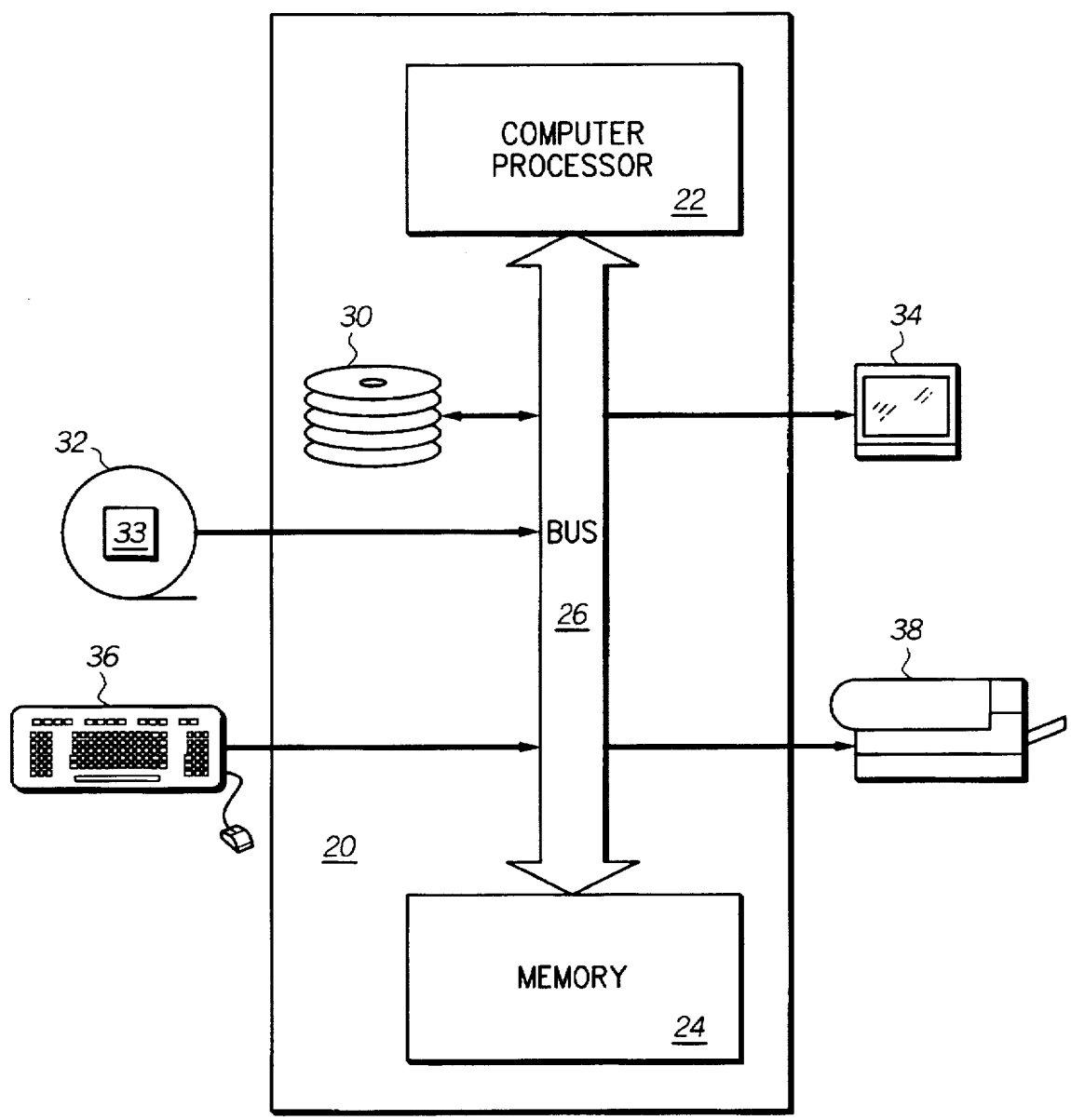
FIG. 13 is a block diagram of a general purpose computer such as is used to implement this invention.

FIG. 13 is a block diagram of a general purpose computer 20 such as is used to implement this invention. The general purpose computer 20 has a Computer Processor 22 and primary Memory 24 connected either directly, or via a DMA port or Bus 26. Also connected to the Bus 26 are Secondary Storage 30, External Storage 32, a monitor 34, keyboard 36, and printer 38.

Tool Input Files 302, Tool Output Files 306, Run History Files 310, Buildlist Files 312, and Criteria Files 314 are primarily stored on Secondary Storage 32, such as magnetic disk (but may be stored on External Storage 32 or in primary Memory 24). Tool Prints 308 and Validate Program Prints 318 can be either spooled to Secondary Storage 30, or printed on a printer 38. External Storage 32 can be floppy disks, tape, CD-ROM, another computer, or anything with equivalent functionality. Computer programs 33 such as Tools 304 and the Validate Program 316 are initially loaded from External Storage 32 and Secondary Storage 32 into primary Memory 24 for execution by the Computer Processor 22.

An important benefit of this invention is the minimization of errors and cycle time in the design and manufacture of complex Integrated Circuits. The invention significantly reduces these factors by allowing concurrent design while increasing reliability of test coverage. VLSI circuit design is explained in detail in *"CMOS VLSI Design, A Systems Perspective"* by Neil Weste and Kamran Eshragian, published by Addison, Wesley Publishing, copyright 1985, with an ISBN of 0-201-08222. The manufacture of Integrated Circuits is extensively disclosed in the two volumes of *"Silicon Processing for the VLSI Era"* by Stanley Wolf, published by Lattice Press of Sunset Beach, Calif. Volume I subtitled *"Process Technology"* was copyrighted in 1986 by Lattice Press and has an ISBN of 0-961672-3-7. Volume II subtitled *"Process Integration"* was copyrighted in 1990 by Lattice Press and has an ISBN of 0-961672-4-5. These three books are incorporated herein by reference for the purpose of teaching VLSI circuit design and the subsequent manufacture of Integrated Circuits therefrom.

Embodiments of the invention disclosed above may be implemented as computer software. It must be appreciated that the design and implementation of computer programs or software utilizes successive decomposition. A problem is broken down into smaller and smaller program elements. Higher level program elements are modules, groups of modules, and even programs, while lower level program elements are program statements, instructions, function calls, and system calls. A collection of low level program elements comprise each higher level program element, and a collection of these program elements comprises the next higher level of program elements. This is repeated until you reach the highest level of program elements, which are usually entire programs, or groups of programs.

Those skilled in the art will recognize that modifications and variations can be made without departing from the spirit of the invention. Therefore, it is intended that this invention encompass all such variations and modifications as fall within the scope of the appended claims.

ATTACHMENT
-1-

BUILDLIST

```
   data/dir1/common/viewTech.def aprsum 1680564
   data/dir1/gr/end.ops aprsum 29928
   data/dir1/gr/macGr.desc aprsum 270714
   data/dir1/gr/macGr.lyr aprsum 93957
5  data/dir1/gr/macGr.ops1 aprsum 1150511
   data/dir1/gr/macGr.ops2 aprsum 146500
   data/dir1/gr/macGr.ops4 aprsum 792431
   data/dir1/lp/end.ops aprsum 29928
   data/dir1/lp/macLp.conlyr aprsum 179435
10 data/dir1/lp/macLp.desc aprsum 11952
   data/dir1/lp/macLp.elm aprsum 262522
   data/dir1/lp/macLp.erc aprsum 109913
   data/dir1/lp/macLp.fnerc aprsum 91877
   data/dir1/lp/macLp.isolat aprsum 61326
15 data/dir1/lp/macLp.lvs aprsum 342171
   data/dir1/lp/macLp.lyr aprsum 365000
   data/dir1/lp/macLp.ops1 aprsum 43967
   data/dir1/lp/macLp.ops2 aprsum 161705
   data/dir1/mth/macBBndleaf.drc aprsum 234967
20 data/dir1/mth/macBMain.drc aprsum 1059408
   data/dir1/mth/macBNotch.drc aprsum 156989
   data/dir1/mth/macBOpen.drc aprsum 200091
   data/dir1/mth/macBOverlap.drc aprsum 47461
   data/dir1/mth/macBVia.drc aprsum 367152
25 data/dir1/mth/macRx.drc aprsum 104049
   data/dir1/mth/macSMain.drc aprsum 502061
   data/dir1/mth/macSOverlap.drc aprsum 12991
   data/dir1/mth/mthDesc.drc aprsum 305127
   data/dir1/mth/mthInput.drc aprsum 842414
30 data/dir1/mth/mthSortMinBar.drc aprsum 178106
   data/dir2/mtv/A2.mtv aprsum 171672
   data/dir2/mtv/AI2.mtv aprsum 174037
   data/dir2/mtv/AI3.mtv aprsum 182791
   data/dir2/mtv/AI4.mtv aprsum 191772
35 data/dir2/mtv/NOT.mtv aprsum 165680
   data/dir2/mtv/O2.mtv aprsum 171722
   data/dir2/mtv/O3.mtv aprsum 180417
   data/dir2/mtv/O4.mtv aprsum 189340
   data/dir3/DEF/MMAA aprsum 21958
40 data/dir3/DEF/N aprsum 9369
   data/dir3/DEF/P aprsum 9371
   data/dir3/DEF/nmos aprsum 7768
   data/dir3/DEF/pmos aprsum 7770
   data/dir3/DEF/rpmos aprsum 7957
45 data/dir3/DEVICE/MMAA aprsum 58912
   data/dir3/DEVICE/nmos aprsum 29137
   data/dir3/DEVICE/pmos aprsum 28929
   data/dir3/DEVICE/rpmos aprsum 29222
   data/dir3/TPGTECH/MMAA aprsum 208087
50 data/dir3/mtv/inv.mtv aprsum 201271
   data/dir4/DEF/WID0 aprsum 72010
   data/dir4/DEF/WID1 aprsum 82984
```

ATTACHMENT
-2-

BUILDLIST

```
    data/dir4/DEF/WID2 aprsum 111435
    data/dir4/DEF/WID3 aprsum 80342
    data/dir4/DEF/WID4 aprsum 69590
    data/dir4/DEF/WID5 aprsum 355643
 5  data/dir4/DEF/WID9 aprsum 72103
    data/dir4/DEF/WIDA aprsum 830260
    data/dir4/DEVICE/WID0 aprsum 137648
    data/dir4/DEVICE/WID1 aprsum 338482
    data/dir4/DEVICE/WID2 aprsum 192228
10  data/dir4/DEVICE/WID3 aprsum 56049
    data/dir4/DEVICE/WID4 aprsum 537590
    data/dir4/DEVICE/WID5 aprsum 796952
    data/dir4/DEVICE/WID9 aprsum 143466
    data/dir4/DEVICE/WIDA aprsum 1245861
15  data/dir4/TPGTECH/WID0 aprsum 101086
    data/dir4/TPGTECH/WID1 aprsum 202194
    data/dir4/TPGTECH/WID2 aprsum 237998
    data/dir4/TPGTECH/WID3 aprsum 251140
    data/dir4/TPGTECH/WID4 aprsum 770744
20  data/dir4/TPGTECH/WID5 aprsum 1167788
    data/dir4/TPGTECH/WID9 aprsum 207681
    data/dir4/TPGTECH/WIDA aprsum 1761481
    data/dir4/desblo/wida.dsb aprsum 1915371
    data/dir4/fs_patt_atpg/wi_wida.fs_patt_atpg aprsum 2283804
25  data/dir4/gl1/wi_wida gl1audit
    REAL:wi_wida:3565493603#SYMB:wi_wida:3251399644#REAL:wi_wida_ru012:4291968313#SYMB:w
    i_wida_ru012:0#REAL:wi_v1:1643229252#SYMB:wi_v1:0#REAL:wi_wida_xrbreq:3636692333#SYMB:
    wi_wida_xrbreq:0
    data/dir4/mtv/wi_wida.mtv aprsum 1046710
30  data/dir4/mtv/wi_wida_bufs.mtv aprsum 1411349
    data/dir4/mtv/wi_wida_rtnrureq.mtv aprsum 75844
    data/dir4/mtv/wi_wida_rtorrureq.mtv aprsum 170918
    data/dir4/mtv/wi_wida_rtreq.mtv aprsum 174796
    data/dir4/mtv/wi_wida_ru012.mtv aprsum 303750
35  data/dir4/mtv/wi_wida_rureq.mtv aprsum 155104
    data/dir4/mtv/wi_wida_xrbreq.mtv aprsum 592417
    data/dir4/time/WIDA.cter aprsum 1113512
    data/dir4/tv_patt_atpg/wi_wida.tv_patt_atpg aprsum 1106616
    data/dir4/verilog_switch/wi_wida.v aprsum 540223
40  data/dir4/verilog_switch/wi_wida_bufs.v aprsum 150035
    data/dir4/verilog_switch/wi_wida_rtnrureq.v aprsum 82798
    data/dir4/verilog_switch/wi_wida_rtorrureq.v aprsum 82021
    data/dir4/verilog_switch/wi_wida_rtreq.v aprsum 182800
    data/dir4/verilog_switch/wi_wida_ru012.v aprsum 82012
45  data/dir4/verilog_switch/wi_wida_rureq.v aprsum 121957
    data/dir4/verilog_switch/wi_wida_xrbreq.v aprsum 15296
```

ATTACHMENT
-3-

CRITERIA FILE

```
     CRITERIA DEVICE (

# QMS Criteria file for DEVICE View - 1st level validation.
       # Via new spec, as of 10/03/94
 5     #
       # ToolRun name: lp
       # Parent Type: DEVICE
       # Dep Type:    DEVICE, DEF

10     FILE_PATTERN "DEVICE/.*"

RUN_REQS lp (

RUN_PATTERN "lp:.*"
15       VALID_RUN (ExitStatus @= 0 || Waiver ~ ".*")
       )

RUN_REQS exclusion (

20       RUN_PATTERN "exclusion:.*"
         VALID_RUN (Waiver ~ ".*")
       )

# NOTE: A parent DEVICE will have dep DEVICEs (different ones...)
25
       FILE_REQS (lp || exclusion)

)

30   CRITERIA TECH (

# QMS Criteria file for TECH View - 1st level validation.
       # Via new spec, as of 10/03/94
       #
35     # ToolRun name: lp
       # Parent Type: TECH
       # Dep Type:    DEVICE, DEF FILE_PATTERN "^TECH/.*"
40
       RUN_REQS lp ( RUN_PATTERN "lp:.*"
         VALID_RUN (ExitStatus @= 0 || Waiver ~ ".*")
45     )

RUN_REQS exclusion (

RUN_PATTERN "exclusion:.*"
50       VALID_RUN (Waiver ~ ".*")
       )
```

ATTACHMENT
-4-

CRITERIA FILE

FILE_REQS lp | | exclusion

}

5    CRITERIA TPGTECH {

QMS Criteria file for TPGTECH View - 1st level validation.
Via new spec, as of 10/03/94

10   # ToolRun name: BEC_Verification
Parent Type: TPGTECH
Dep Type:    DEF FILE_PATTERN "TPGTECH/.*"
15
RUN_REQS BEC_Verification {

RUN_PATTERN "BEC_Verification:.*"
VALID_RUN (ExitStatus @= 0 | | Waiver ~ ".*")
20   }

RUN_REQS exclusion {

RUN_PATTERN "exclusion:.*"
25   VALID_RUN (Waiver ~ ".*")
}

FILE_REQS (BEC_Verification | | exclusion)

30   }

CRITERIA desblo {

QMS Criteria file for desblo View - 1st level validation.
35   # Via new spec, as of 10/03/94

ToolRun name: BEC_Verification
Parent Type: desblo
Dep Type:    DEF
40
FILE_PATTERN "desblo/.*"

RUN_REQS BEC_Verification {

45   RUN_PATTERN "BEC_Verification:.*"
VALID_RUN (ExitStatus @= 0 | | Waiver ~ ".*")
}

RUN_REQS exclusion {
50
RUN_PATTERN "exclusion:.*"
VALID_RUN (Waiver ~ ".*")

ATTACHMENT
-5-

CRITERIA FILE

```
    }

FILE_REQS (BEC_Verification | | exclusion)

5  }

CRITERIA exclusion {

# QMS Criteria file for exclusions - 1st level validation.
10  #
    # ToolRun name: exclusion
    # Parent type: "exclusion/.*"
    # Deps:      Any file that is excluded 15     FILE_PATTERN "exclusion/.*"

RUN_REQS exclusion {

RUN_PATTERN "exclusion:.*"
20        VALID_RUN (Waiver ~ ".*")
       }

FILE_REQS exclusion
    }
25
    CRITERIA gl1 {

# QMS Criteria file for GL1 Views - 1st level validation.
    # Via new spec, as of 10/03/94
30  #
    # ToolRun name: lp, sm, bm, gr (NOTE: Not for books! sm not required for books)
    # Parent type: gl1      (lp, sm, bm, gr)
    # Dep types : control decks (gl1 only)
    #              DEVICE, DEF (lp only)
35
       FILE_PATTERN "gl1/.*"

RUN_REQS lp {

40        RUN_PATTERN "lp:.*"
          VALID_RUN (ExitStatus @= 0 | | Waiver ~ ".*")
          # How should the following be coded?  We need to find a DEVICE
          # with the same name as the gl1 being validated.
       }
45
       RUN_REQS gr {

RUN_PATTERN "gr:.*"
          VALID_RUN (ExitStatus @= 0 | | Waiver ~ ".*")
50     }

RUN_REQS sm {
```

ATTACHMENT
-6-

CRITERIA FILE

```
     RUN_PATTERN "sm:.*"
     VALID_RUN (ExitStatus @= 0 || Waiver ~ ".*")
   }
5
   RUN_REQS bm {

RUN_PATTERN "bm:.*"
     VALID_RUN (ExitStatus @= 0 || Waiver ~ ".*")
10 }

RUN_REQS exclusion {

RUN_PATTERN "exclusion:.*"
15   VALID_RUN (Waiver ~ ".*")
   }

FILE_REQS ((lp && gr && sm && bm) || exclusion)

20 }

CRITERIA mtv {

# QMS Criteria file for mtv View - 1st level validation.
25 # Via new spec, as of 10/03/94
   #
   # ToolRun name: FastScan_ATPG
   # Parent Type: mtv
   # Dep Type:    mtv, fs_patt_atpg, fs_patt_exh
30
     FILE_PATTERN "mtv/.*"

RUN_REQS FastScan_ATPG {

35     RUN_PATTERN "FastScan_ATPG:.*"
       VALID_RUN (ExitStatus @= 0 || Waiver ~ ".*")
     }

RUN_REQS exclusion {
40
       RUN_PATTERN "exclusion:.*"
       VALID_RUN (Waiver ~ ".*")
     }

45 # NOTE: The fs_patt_exh view will only be present in some cases.
   # Is this condition a problem? Is this criteria file set up correctly
   # for this?

FILE_REQS (FastScan_ATPG || exclusion)
50
   }
```

ATTACHMENT
-7-

CRITERIA FILE

```
   CRITERIA time {

# QMS Criteria file for time View - 1st level validation.
       # Via new spec, as of 10/03/94
 5     #
       # ToolRun name: ETE_COVERAGE_CHECK, ETE_SEMANTIC_CHECK
       # Parent Type: time
       # Dep Type:    desblo, view-dependent control decks 10     FILE_PATTERN "time/.*"

RUN_REQS ETE_COVERAGE_CHECK {

RUN_PATTERN "ETE_COVERAGE_CHECK:.*"
15        VALID_RUN (ExitStatus @= 0 || Waiver ~ ".*")
       }

RUN_REQS ETE_SEMANTIC_CHECK {

20        RUN_PATTERN "ETE_SEMANTIC_CHECK:.*"
          VALID_RUN (ExitStatus @= 0 || Waiver ~ ".*")
       }

RUN_REQS exclusion {
25
          RUN_PATTERN "exclusion:.*"
          VALID_RUN (Waiver ~ ".*")
       }

30     FILE_REQS (ETE_COVERAGE_CHECK && ETE_SEMANTIC_CHECK) || exclusion

}

CRITERIA verilog_switch {
35
       # QMS Criteria file for verilog_switch View - 1st level validation.
       # Via new spec, as of 10/03/94
       #
       # ToolRun name: Verilog_ATPG
40     # Parent Type: verilog_switch
       # Dep Type:    mtv, tv_patt_atpg, fs_patt_atpg, mtv,
       #              tv_patt_exh, fs_patt_exh 45     FILE_PATTERN "verilog_switch/.*"

RUN_REQS Verilog_ATPG {

RUN_PATTERN "Verilog_ATPG:.*"
50        VALID_RUN (ExitStatus @= 0 || Waiver ~ ".*")
       }
```

ATTACHMENT
-8-

CRITERIA FILE

```
    RUN_REQS exclusion {

RUN_PATTERN "exclusion:.*"
      VALID_RUN (Waiver ~ ".*")
5   }

NOTE: The fs_patt_exh and tv_patt_exh are not always deps.

FILE_REQS (Verilog_ATPG | | exclusion)
10  }

#CRITERIA catch-all {
    #
15  #}
```

ATTACHMENT
-9-

RUN HISTORY sm:/tmp_mnt/home/anitak/Work/Projects/qmslite/CriteriaCompiler/aprlite_sigs:anitak:pi
xie:778979404:99
string GL1BXT=0:HDVMETH=0:GL12GDS=0:PDRACULA=0:JXRUN=0
ExitStatus 0
* *
/home/anitak/Work/Projects/qmslite/CriteriaCompiler/data/dir1/mth/macSMain.drc
aprsum 502061
/home/anitak/Work/Projects/qmslite/CriteriaCompiler/data/dir1/mth/macRx.drc aprsum
104049
/home/anitak/Work/Projects/qmslite/CriteriaCompiler/data/dir1/mth/mthSortMinBar.drc
aprsum 178106
/home/anitak/Work/Projects/qmslite/CriteriaCompiler/data/dir1/mth/macSOverlap.drc
aprsum 12991
/home/anitak/Work/Projects/qmslite/CriteriaCompiler/data/dir1/mth/mthInput.drc
aprsum 842414
/home/anitak/Work/Projects/qmslite/CriteriaCompiler/data/dir1/mth/mthDesc.drc
aprsum 305127
/home/anitak/Work/Projects/qmslite/CriteriaCompiler/data/dir1/common/viewTech.def
aprsum 1680564
/home/anitak/Work/Projects/qmslite/CriteriaCompiler/data/dir4/gl1/wi_wida gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0
* * *
gr:/tmp_mnt/home/anitak/Work/Projects/qmslite/CriteriaCompiler/aprlite_sigs:anitak:pix
ie:778979387:99
string GL1BXT=0:GL12GDS=0:PDRACULA=0:JXRUN=0
ExitStatus 0
* *
/home/anitak/Work/Projects/qmslite/CriteriaCompiler/data/dir1/gr/end.ops aprsum 29928
/home/anitak/Work/Projects/qmslite/CriteriaCompiler/data/dir1/gr/macGr.ops4 aprsum
792431
/home/anitak/Work/Projects/qmslite/CriteriaCompiler/data/dir1/gr/macGr.ops2 aprsum
146500
/home/anitak/Work/Projects/qmslite/CriteriaCompiler/data/dir1/gr/macGr.ops1 aprsum
1150511
/home/anitak/Work/Projects/qmslite/CriteriaCompiler/data/dir1/gr/macGr.lyr aprsum
93957
/home/anitak/Work/Projects/qmslite/CriteriaCompiler/data/dir1/gr/macGr.desc aprsum
270714
/home/anitak/Work/Projects/qmslite/CriteriaCompiler/data/dir1/common/viewTech.def
aprsum 1680564
/home/anitak/Work/Projects/qmslite/CriteriaCompiler/data/dir4/gl1/wi_wida gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0
* * *
lp:/tmp_mnt/home/anitak/Work/Projects/qmslite/CriteriaCompiler/aprlite_sigs:anitak:pi
xie:778979399:99
string
GL1BXT=0:VLNETS=0:GL12GDS=0:CDLNETLIST=:LOGLVS=0:PDRACULA=0:JXRUN=0
ExitStatus 20

ATTACHMENT
-10-

RUN HISTORY

```
* *
/home/anitak/Work/Projects/qmslite/CriteriaCompiler/data/dir4/DEF/WID2 aprsum
111435
/home/anitak/Work/Projects/qmslite/CriteriaCompiler/data/dir4/DEF/WID1 aprsum 82984
/home/anitak/Work/Projects/qmslite/CriteriaCompiler/data/dir4/DEF/WID0 aprsum 72010
/home/anitak/Work/Projects/qmslite/CriteriaCompiler/data/dir4/DEF/WID9 aprsum 72103
/home/anitak/Work/Projects/qmslite/CriteriaCompiler/data/dir3/DEF/pmos aprsum 7770
/home/anitak/Work/Projects/qmslite/CriteriaCompiler/data/dir3/DEF/N aprsum 9369
/home/anitak/Work/Projects/qmslite/CriteriaCompiler/data/dir3/DEF/nmos aprsum 7768
/home/anitak/Work/Projects/qmslite/CriteriaCompiler/data/dir3/DEF/MMAA aprsum
21958
/home/anitak/Work/Projects/qmslite/CriteriaCompiler/data/dir3/DEF/P aprsum 9371
/home/anitak/Work/Projects/qmslite/CriteriaCompiler/data/dir3/DEF/rpmos aprsum 7957
/home/anitak/Work/Projects/qmslite/CriteriaCompiler/data/dir4/DEVICE/WID2 aprsum
192228
/home/anitak/Work/Projects/qmslite/CriteriaCompiler/data/dir4/DEVICE/WID1 aprsum
338482
/home/anitak/Work/Projects/qmslite/CriteriaCompiler/data/dir4/DEVICE/WID0 aprsum
137648
/home/anitak/Work/Projects/qmslite/CriteriaCompiler/data/dir4/DEVICE/WID9 aprsum
143466
/home/anitak/Work/Projects/qmslite/CriteriaCompiler/data/dir4/DEF/WID3 aprsum 80342
/home/anitak/Work/Projects/qmslite/CriteriaCompiler/data/dir4/DEF/WID5 aprsum
355643
/home/anitak/Work/Projects/qmslite/CriteriaCompiler/data/dir3/DEVICE/pmos aprsum
28929
/home/anitak/Work/Projects/qmslite/CriteriaCompiler/data/dir3/DEVICE/nmos aprsum
29137
/home/anitak/Work/Projects/qmslite/CriteriaCompiler/data/dir3/DEVICE/MMAA aprsum
58912
/home/anitak/Work/Projects/qmslite/CriteriaCompiler/data/dir3/DEVICE/rpmos aprsum
29222
/home/anitak/Work/Projects/qmslite/CriteriaCompiler/data/dir4/DEF/WID4 aprsum 69590
/home/anitak/Work/Projects/qmslite/CriteriaCompiler/data/dir4/DEVICE/WID3 aprsum
56049
/home/anitak/Work/Projects/qmslite/CriteriaCompiler/data/dir4/DEVICE/WID5 aprsum
796952
/home/anitak/Work/Projects/qmslite/CriteriaCompiler/data/dir4/DEVICE/WID4 aprsum
537590
/home/anitak/Work/Projects/qmslite/CriteriaCompiler/data/dir4/DEF/WIDA aprsum
830260
/home/anitak/Work/Projects/qmslite/CriteriaCompiler/data/dir4/DEVICE/WIDA aprsum
1245861
* * *
FastScan_ATPG:/tmp_mnt/home/anitak/Work/Projects/qmslite/CriteriaCompiler/aprlite_s
igs:anitak:pixie:767308290:99
string Coverage=100.00%:Errors=0:Warnings=0
ExitStatus 0
* *
/home/anitak/Work/Projects/qmslite/CriteriaCompiler/data/dir4/fs_patt_atpg/wi_wida.f
s_patt_atpg aprsum 2283804
```

ATTACHMENT
-11-

RUN HISTORY

```
     /home/anitak/Work/Projects/qmslite/CriteriaCompiler/data/dir2/mtv/O4.mtv aprsum
     189340
     /home/anitak/Work/Projects/qmslite/CriteriaCompiler/data/dir4/mtv/wi_wida_rureq.mtv
     aprsum 155104
 5   /home/anitak/Work/Projects/qmslite/CriteriaCompiler/data/dir4/mtv/wi_wida_rtreq.mtv
     aprsum 174796
     /home/anitak/Work/Projects/qmslite/CriteriaCompiler/data/dir4/mtv/wi_wida_rtorrureq.
     mtv aprsum 170918
     /home/anitak/Work/Projects/qmslite/CriteriaCompiler/data/dir4/mtv/wi_wida_rtnrureq.
10   mtv aprsum 75844
     /home/anitak/Work/Projects/qmslite/CriteriaCompiler/data/dir3/mtv/inv.mtv aprsum
     201271
     /home/anitak/Work/Projects/qmslite/CriteriaCompiler/data/dir2/mtv/O3.mtv aprsum
     180417
15   /home/anitak/Work/Projects/qmslite/CriteriaCompiler/data/dir2/mtv/O2.mtv aprsum
     171722
     /home/anitak/Work/Projects/qmslite/CriteriaCompiler/data/dir2/mtv/NOT.mtv aprsum
     165680
     /home/anitak/Work/Projects/qmslite/CriteriaCompiler/data/dir2/mtv/AI4.mtv aprsum
20   191772
     /home/anitak/Work/Projects/qmslite/CriteriaCompiler/data/dir2/mtv/AI3.mtv aprsum
     182791
     /home/anitak/Work/Projects/qmslite/CriteriaCompiler/data/dir2/mtv/AI2.mtv aprsum
     174037
25   /home/anitak/Work/Projects/qmslite/CriteriaCompiler/data/dir2/mtv/A2.mtv aprsum
     171672
     /home/anitak/Work/Projects/qmslite/CriteriaCompiler/data/dir4/mtv/wi_wida_xrbreq.mt
     v aprsum 592417
     /home/anitak/Work/Projects/qmslite/CriteriaCompiler/data/dir4/mtv/wi_wida_ru012.mt
30   v aprsum 303750
     /home/anitak/Work/Projects/qmslite/CriteriaCompiler/data/dir4/mtv/wi_wida_bufs.mtv
     aprsum 1411349
     /home/anitak/Work/Projects/qmslite/CriteriaCompiler/data/dir4/mtv/wi_wida.mtv
     aprsum 1046710
35   * * *
     ETE_COVERAGE_CHECK:/tmp_mnt/home/anitak/Work/Projects/qmslite/CriteriaCompile
     r/aprlite_sigs:anitak:pixie:767403060:99
     ExitStatus 0
     * *
40   /home/anitak/Work/Projects/qmslite/CriteriaCompiler/data/dir4/desblo/wida.dsb aprsum
     1915371
     /home/anitak/Work/Projects/qmslite/CriteriaCompiler/data/dir4/time/WIDA.eter aprsum
     1113512
     * * *
45   BEC_Verification:/tmp_mnt/home/anitak/Work/Projects/qmslite/CriteriaCompiler/aprlite
     _sigs:anitak:pixie:767309147:99
     ExitStatus 0
     * *
     /home/anitak/Work/Projects/qmslite/CriteriaCompiler/data/dir4/DEF/WIDA aprsum
50   830260
     /home/anitak/Work/Projects/qmslite/CriteriaCompiler/data/dir3/DEF/MMAA aprsum
     21958
```

ATTACHMENT
-12-

RUN HISTORY

```
    /home/anitak/Work/Projects/qmslite/CriteriaCompiler/data/dir4/DEF/WID9 aprsum 72103
    /home/anitak/Work/Projects/qmslite/CriteriaCompiler/data/dir4/DEF/WID2 aprsum
    111435
    /home/anitak/Work/Projects/qmslite/CriteriaCompiler/data/dir4/DEF/WID1 aprsum 82984
 5  /home/anitak/Work/Projects/qmslite/CriteriaCompiler/data/dir4/DEF/WID0 aprsum 72010
    /home/anitak/Work/Projects/qmslite/CriteriaCompiler/data/dir4/DEF/WID5 aprsum
    355643
    /home/anitak/Work/Projects/qmslite/CriteriaCompiler/data/dir4/DEF/WID4 aprsum 69590
    /home/anitak/Work/Projects/qmslite/CriteriaCompiler/data/dir4/DEF/WID3 aprsum 80342
10  /home/anitak/Work/Projects/qmslite/CriteriaCompiler/data/dir3/TPGTECH/MMAA
    aprsum 208087
    /home/anitak/Work/Projects/qmslite/CriteriaCompiler/data/dir4/TPGTECH/WID9 aprsum
    207681
    /home/anitak/Work/Projects/qmslite/CriteriaCompiler/data/dir4/TPGTECH/WID2 aprsum
15  237998
    /home/anitak/Work/Projects/qmslite/CriteriaCompiler/data/dir4/TPGTECH/WID1 aprsum
    202194
    /home/anitak/Work/Projects/qmslite/CriteriaCompiler/data/dir4/TPGTECH/WID0 aprsum
    101086
20  /home/anitak/Work/Projects/qmslite/CriteriaCompiler/data/dir4/TPGTECH/WID5 aprsum
    1167788
    /home/anitak/Work/Projects/qmslite/CriteriaCompiler/data/dir4/TPGTECH/WID4 aprsum
    770744
    /home/anitak/Work/Projects/qmslite/CriteriaCompiler/data/dir4/TPGTECH/WID3 aprsum
25  251140
    /home/anitak/Work/Projects/qmslite/CriteriaCompiler/data/dir4/TPGTECH/WIDA
    aprsum 1761481
    /home/anitak/Work/Projects/qmslite/CriteriaCompiler/data/dir4/desblo/wida.dsb aprsum
    1915371
30  /home/anitak/Work/Projects/qmslite/CriteriaCompiler/data/dir4/TPGTECH/WID3 aprsum
    251140
    /home/anitak/Work/Projects/qmslite/CriteriaCompiler/data/dir4/TPGTECH/WID4 aprsum
    770744
    /home/anitak/Work/Projects/qmslite/CriteriaCompiler/data/dir4/TPGTECH/WID5 aprsum
35  1167788
    /home/anitak/Work/Projects/qmslite/CriteriaCompiler/data/dir4/TPGTECH/WID0 aprsum
    101086
    /home/anitak/Work/Projects/qmslite/CriteriaCompiler/data/dir4/TPGTECH/WID1 aprsum
    202194
40  /home/anitak/Work/Projects/qmslite/CriteriaCompiler/data/dir4/TPGTECH/WID2 aprsum
    237998
    /home/anitak/Work/Projects/qmslite/CriteriaCompiler/data/dir4/TPGTECH/WID9 aprsum
    207681
    /home/anitak/Work/Projects/qmslite/CriteriaCompiler/data/dir3/TPGTECH/MMAA
45  aprsum 208087
    /home/anitak/Work/Projects/qmslite/CriteriaCompiler/data/dir4/DEF/WID3 aprsum 80342
    /home/anitak/Work/Projects/qmslite/CriteriaCompiler/data/dir4/DEF/WID4 aprsum 69590
    /home/anitak/Work/Projects/qmslite/CriteriaCompiler/data/dir4/DEF/WID5 aprsum
    355643
50  /home/anitak/Work/Projects/qmslite/CriteriaCompiler/data/dir4/DEF/WID0 aprsum 72010
    /home/anitak/Work/Projects/qmslite/CriteriaCompiler/data/dir4/DEF/WID1 aprsum 82984
```

ATTACHMENT
-13-

RUN HISTORY

/home/anitak/Work/Projects/qmslite/CriteriaCompiler/data/dir4/DEF/WID2 aprsum 111435
/home/anitak/Work/Projects/qmslite/CriteriaCompiler/data/dir4/DEF/WID9 aprsum 72103
/home/anitak/Work/Projects/qmslite/CriteriaCompiler/data/dir3/DEF/MMAA aprsum 21958
/home/anitak/Work/Projects/qmslite/CriteriaCompiler/data/dir4/DEF/WIDA aprsum 830260
* * *
ETE_SEMANTIC_CHECK:/tmp_mnt/home/anitak/Work/Projects/qmslite/CriteriaCompiler/aprlite_sigs:anitak:pixie:767403055:99
ExitStatus 0
* *
/home/anitak/Work/Projects/qmslite/CriteriaCompiler/data/dir4/time/WIDA.eter aprsum 1113512
/home/anitak/Work/Projects/qmslite/CriteriaCompiler/data/dir4/DEF/WIDA aprsum 830260
* * *
Verilog_ATPG:/tmp_mnt/home/anitak/Work/Projects/qmslite/CriteriaCompiler/aprlite_sigs:anitak:pixie:767381256:99
ExitStatus 0
* *
/home/anitak/Work/Projects/qmslite/CriteriaCompiler/data/dir4/verilog_switch/wi_wida.v aprsum 540223
/home/anitak/Work/Projects/qmslite/CriteriaCompiler/data/dir4/verilog_switch/wi_wida_bufs.v aprsum 150035
/home/anitak/Work/Projects/qmslite/CriteriaCompiler/data/dir4/verilog_switch/wi_wida_ru012.v aprsum 82012
/home/anitak/Work/Projects/qmslite/CriteriaCompiler/data/dir4/verilog_switch/wi_wida_xrbreq.v aprsum 15296
/home/anitak/Work/Projects/qmslite/CriteriaCompiler/data/dir4/verilog_switch/wi_wida_rtnrureq.v aprsum 82798
/home/anitak/Work/Projects/qmslite/CriteriaCompiler/data/dir4/verilog_switch/wi_wida_rtorrureq.v aprsum 82021
/home/anitak/Work/Projects/qmslite/CriteriaCompiler/data/dir4/verilog_switch/wi_wida_rtreq.v aprsum 182800
/home/anitak/Work/Projects/qmslite/CriteriaCompiler/data/dir4/verilog_switch/wi_wida_rureq.v aprsum 121957
/home/anitak/Work/Projects/qmslite/CriteriaCompiler/data/dir4/tv_patt_atpg/wi_wida.tv_patt_atpg aprsum 1106616
/home/anitak/Work/Projects/qmslite/CriteriaCompiler/data/dir4/fs_patt_atpg/wi_wida.fs_patt_atpg aprsum 2283804
/home/anitak/Work/Projects/qmslite/CriteriaCompiler/data/dir4/mtv/wi_wida.mtv aprsum 1046710
* * *
bm:/tmp_mnt/home/anitak/Work/Projects/qmslite/CriteriaCompiler/aprlite_sigs:anitak:pixie:778979381:99
ExitStatus 0
string GL1BXT=0:HDVMETH=0:GL12GDS=0:PDRACULA=0:JXRUN=0
* *
/home/anitak/Work/Projects/qmslite/CriteriaCompiler/data/dir4/gl1/wi_wida gl1audit REAL:wi_wida:3565493603#SYMB:wi_wida:3251399644#REAL:wi_wida_ru012:4291968313#S

ATTACHMENT
-14-

RUN HISTORY

YMB:wi_wida_ru012:0#REAL:wi_v1:1643229252#SYMB:wi_v1:0#REAL:wi_wida_xrbreq:363
6692333#SYMB:wi_wida_xrbreq:0
/home/anitak/Work/Projects/qmslite/CriteriaCompiler/data/dir1/common/viewTech.def
aprsum 1680564
/home/anitak/Work/Projects/qmslite/CriteriaCompiler/data/dir1/mth/mthDesc.drc
aprsum 305127
/home/anitak/Work/Projects/qmslite/CriteriaCompiler/data/dir1/mth/mthInput.drc
aprsum 842414
/home/anitak/Work/Projects/qmslite/CriteriaCompiler/data/dir1/mth/macBOverlap.drc
aprsum 47461
/home/anitak/Work/Projects/qmslite/CriteriaCompiler/data/dir1/mth/mthSortMinBar.drc
aprsum 178106
/home/anitak/Work/Projects/qmslite/CriteriaCompiler/data/dir1/mth/macRx.drc aprsum
104049
/home/anitak/Work/Projects/qmslite/CriteriaCompiler/data/dir1/mth/macBMain.drc
aprsum 1059408
/home/anitak/Work/Projects/qmslite/CriteriaCompiler/data/dir1/mth/macBOpen.drc
aprsum 200091
/home/anitak/Work/Projects/qmslite/CriteriaCompiler/data/dir1/mth/macBNotch.drc
aprsum 156989
/home/anitak/Work/Projects/qmslite/CriteriaCompiler/data/dir1/mth/macBVia.drc
aprsum 367152
/home/anitak/Work/Projects/qmslite/CriteriaCompiler/data/dir1/mth/macBBndleaf.drc
aprsum 234967
* * *
lp:/tmp_mnt/home/anitak/Work/Projects/qmslite/CriteriaCompiler/aprlite_sigs:anitak:pi
xie:778979393:99
ExitStatus 20
string
GL1BXT=0:VLNETS=0:GL12GDS=0:CDLNETLIST=:LOGLVS=0:PDRACULA=0:JXRUN=0
* *
/home/anitak/Work/Projects/qmslite/CriteriaCompiler/data/dir4/gl1/wi_wida gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0
/home/anitak/Work/Projects/qmslite/CriteriaCompiler/data/dir1/common/viewTech.def
aprsum 1680564
/home/anitak/Work/Projects/qmslite/CriteriaCompiler/data/dir1/lp/macLp.desc aprsum
11952
/home/anitak/Work/Projects/qmslite/CriteriaCompiler/data/dir1/lp/macLp.lyr aprsum
365000
/home/anitak/Work/Projects/qmslite/CriteriaCompiler/data/dir1/lp/macLp.conlyr aprsum
179435
/home/anitak/Work/Projects/qmslite/CriteriaCompiler/data/dir1/lp/macLp.ops1 aprsum
43967
/home/anitak/Work/Projects/qmslite/CriteriaCompiler/data/dir1/lp/macLp.ops2 aprsum
161705
/home/anitak/Work/Projects/qmslite/CriteriaCompiler/data/dir1/lp/macLp.isolat aprsum
61326
/home/anitak/Work/Projects/qmslite/CriteriaCompiler/data/dir1/lp/macLp.elm aprsum
262522

ATTACHMENT
-15-

RUN HISTORY

/home/anitak/Work/Projects/qmslite/CriteriaCompiler/data/dir1/lp/macLp.fnerc aprsum 91877
/home/anitak/Work/Projects/qmslite/CriteriaCompiler/data/dir1/lp/macLp.erc aprsum 109913
/home/anitak/Work/Projects/qmslite/CriteriaCompiler/data/dir1/lp/macLp.lvs aprsum 342171
/home/anitak/Work/Projects/qmslite/CriteriaCompiler/data/dir1/lp/end.ops aprsum 29928
* * *

ATTACHMENT
-16-

VALIDATION RESULTS (fyi) current working directory =
/tmp_mnt/home/anitak/Work/Projects/qmslite/CriteriaCompiler
(fyi) searchpath = .
(fyi) audit_comparator = ./comparator
(fyi) buildlist file =
/tmp_mnt/home/anitak/Work/Projects/qmslite/CriteriaCompiler/buildlist.v4
(fyi) rho database =
/tmp_mnt/home/anitak/Work/Projects/qmslite/CriteriaCompiler/rhodb.v4
(fyi) criteria file = ./test.criteria (fyi) Checking buildlist contents to make sure the same file is not listed more than once...
(fyi) Done checking buildlist contents.

(fyi) Processing criteria record DEVICE ...
HI - fpat = "DEVICE/.*"
HI - run_record = lp
HI - run_pattern_defn = "lp:.*"
Warning. yyparse(): [lineno=16, linepos=30]. File
/tmp_mnt/home/anitak/Work/Projects/qmslite/CriteriaCompiler/data/dir3/DEVICE/MM
AA, aprsum 58912 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir3/DEVICE/nmos,
aprsum 29137 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir3/DEVICE/pmos
, aprsum 28929 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir3/DEVICE/rpmo
s, aprsum 29222 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
0, aprsum 137648 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
1, aprsum 338482 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
2, aprsum 192228 did not meet sub-criteria for property ExitStatus in tool-rhoid =

ATTACHMENT
-17-

VALIDATION RESULTS lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
3, aprsum 56049 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
4, aprsum 537590 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
5, aprsum 796952 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
9, aprsum 143466 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno=16, linepos=30]. File
/tmp_mnt/home/anitak/Work/Projects/qmslite/CriteriaCompiler/data/dir4/DEVICE/WID
A, aprsum 1245861 did not meet sub-criteria for property ExitStatus in tool-rhoid =
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.
Warning. yyparse(): [lineno = 16, linepos = 47]. Could not find property Waiver in run-history
object
lp:/tmp_mnt/home/anitak/Work/Projects/qmslite/CriteriaCompiler/aprlite_sigs:anitak:pi
xie:778979399:99.

ATTACHMENT
-18-

VALIDATION RESULTS

Warning. yyparse(): [lineno = 16, linepos = 47]. Could not find property Waiver in run-history object
lp:/tmp_mnt/home/anitak/Work/Projects/qmslite/CriteriaCompiler/aprlite_sigs:anitak:pi
xie:778979399:99.

5 Warning. yyparse(): [lineno = 16, linepos = 47]. Could not find property Waiver in run-history object
lp:/tmp_mnt/home/anitak/Work/Projects/qmslite/CriteriaCompiler/aprlite_sigs:anitak:pi
xie:778979399:99.

Warning. yyparse(): [lineno = 16, linepos = 47]. Could not find property Waiver in run-history
10 object
lp:/tmp_mnt/home/anitak/Work/Projects/qmslite/CriteriaCompiler/aprlite_sigs:anitak:pi
xie:778979399:99.

Warning. yyparse(): [lineno = 16, linepos = 47]. Could not find property Waiver in run-history object
15 lp:/tmp_mnt/home/anitak/Work/Projects/qmslite/CriteriaCompiler/aprlite_sigs:anitak:pi
xie:778979399:99.

Warning. yyparse(): [lineno = 16, linepos = 47]. Could not find property Waiver in run-history object
lp:/tmp_mnt/home/anitak/Work/Projects/qmslite/CriteriaCompiler/aprlite_sigs:anitak:pi
20 xie:778979399:99.

Warning. yyparse(): [lineno = 16, linepos = 47]. Could not find property Waiver in run-history object
lp:/tmp_mnt/home/anitak/Work/Projects/qmslite/CriteriaCompiler/aprlite_sigs:anitak:pi
xie:778979399:99.

25 HI - run_record = exclusion
HI - run_pattern_defn = "exclusion:.*"
Warning. yyparse(): No applicable exclusion tool-run for
/tmp_mnt/home/anitak/Work/Projects/qmslite/CriteriaCompiler/data/dir3/DEVICE/MM
AA, aprsum 58912 in criteria record DEVICE.

30 Warning. yyparse(): No applicable exclusion tool-run for
/tmp_mnt/home/anitak/Work/Projects/qmslite/CriteriaCompiler/data/dir3/DEVICE/nmos, aprsum 29137 in criteria record DEVICE.
Warning. yyparse(): No applicable exclusion tool-run for
/tmp_mnt/home/anitak/Work/Projects/qmslite/CriteriaCompiler/data/dir3/DEVICE/pmos
35 , aprsum 28929 in criteria record DEVICE.
Warning. yyparse(): No applicable exclusion tool-run for
/tmp_mnt/home/anitak/Work/Projects/qmslite/CriteriaCompiler/data/dir3/DEVICE/rpmo
s, aprsum 29222 in criteria record DEVICE.
Warning. yyparse(): No applicable exclusion tool-run for
40 /tmp_mnt/home/anitak/Work/Projects/qmslite/CriteriaCompiler/data/dir4/DEVICE/WID
0, aprsum 137648 in criteria record DEVICE.
Warning. yyparse(): No applicable exclusion tool-run for
/tmp_mnt/home/anitak/Work/Projects/qmslite/CriteriaCompiler/data/dir4/DEVICE/WID
1, aprsum 338482 in criteria record DEVICE.
45 Warning. yyparse(): No applicable exclusion tool-run for
/tmp_mnt/home/anitak/Work/Projects/qmslite/CriteriaCompiler/data/dir4/DEVICE/WID
2, aprsum 192228 in criteria record DEVICE.
Warning. yyparse(): No applicable exclusion tool-run for
/tmp_mnt/home/anitak/Work/Projects/qmslite/CriteriaCompiler/data/dir4/DEVICE/WID
50 3, aprsum 56049 in criteria record DEVICE.

ATTACHMENT
-19-

VALIDATION RESULTS

Warning. yyparse(): No applicable exclusion tool-run for
/tmp_mnt/home/anitak/Work/Projects/qmslite/CriteriaCompiler/data/dir4/DEVICE/WID
4, aprsum 537590 in criteria record DEVICE.
Warning. yyparse(): No applicable exclusion tool-run for
/tmp_mnt/home/anitak/Work/Projects/qmslite/CriteriaCompiler/data/dir4/DEVICE/WID
5, aprsum 796952 in criteria record DEVICE.
Warning. yyparse(): No applicable exclusion tool-run for
/tmp_mnt/home/anitak/Work/Projects/qmslite/CriteriaCompiler/data/dir4/DEVICE/WID
9, aprsum 143466 in criteria record DEVICE.
Warning. yyparse(): No applicable exclusion tool-run for
/tmp_mnt/home/anitak/Work/Projects/qmslite/CriteriaCompiler/data/dir4/DEVICE/WID
A, aprsum 1245861 in criteria record DEVICE.

>>>CRITERIA RECORD: DEVICE
FILE:
/tmp_mnt/home/anitak/Work/Projects/qmslite/CriteriaCompiler/data/dir3/DEVICE/MM
AA, aprsum 58912
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)
FILE:
/tmp_mnt/home/anitak/Work/Projects/qmslite/CriteriaCompiler/data/dir3/DEVICE/nmos,
aprsum 29137
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)
FILE:
/tmp_mnt/home/anitak/Work/Projects/qmslite/CriteriaCompiler/data/dir3/DEVICE/pmos
, aprsum 28929
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)
FILE:
/tmp_mnt/home/anitak/Work/Projects/qmslite/CriteriaCompiler/data/dir3/DEVICE/rpmo
s, aprsum 29222
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)
FILE:
/tmp_mnt/home/anitak/Work/Projects/qmslite/CriteriaCompiler/data/dir4/DEVICE/WID
0, aprsum 137648
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)
FILE:
/tmp_mnt/home/anitak/Work/Projects/qmslite/CriteriaCompiler/data/dir4/DEVICE/WID
1, aprsum 338482
    Audit Status: FAIL using the following rho-ids:
        lp:/tmp_mnt/home/anitak/Work/Projects/qmslite/CriteriaCompiler/aprlite_sigs:an
itak:pixie:778979399:99 (evaluated to 0)

ATTACHMENT
-20-

VALIDATION RESULTS

FILE:
/tmp_mnt/home/anitak/Work/Projects/qmslite/CriteriaCompiler/data/dir4/DEVICE/WID 2, aprsum 192228
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)
FILE:
/tmp_mnt/home/anitak/Work/Projects/qmslite/CriteriaCompiler/data/dir4/DEVICE/WID 3, aprsum 56049
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)
FILE:
/tmp_mnt/home/anitak/Work/Projects/qmslite/CriteriaCompiler/data/dir4/DEVICE/WID 4, aprsum 537590
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)
FILE:
/tmp_mnt/home/anitak/Work/Projects/qmslite/CriteriaCompiler/data/dir4/DEVICE/WID 5, aprsum 796952
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)
FILE:
/tmp_mnt/home/anitak/Work/Projects/qmslite/CriteriaCompiler/data/dir4/DEVICE/WID 9, aprsum 143466
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)
FILE:
/tmp_mnt/home/anitak/Work/Projects/qmslite/CriteriaCompiler/data/dir4/DEVICE/WID A, aprsum 1245861
    Audit Status: FAIL using the following rho-ids:
        lp:/tmp_mnt/home/anitak/Work/Projects/qmslite/CriteriaCompiler/aprlite_sigs:anitak:pixie:778979399:99 (evaluated to 0)

(fyi) Processing criteria record TECH ...
HI - fpat = "^TECH/.*"
Warning. yyparse(): [lineno = 40, linepos = 25]. No files in buildlist match file pattern "^TECH/.*".
HI - run_record = lp
HI - run_pattern_defn = "lp:.*"
HI - run_record = exclusion
HI - run_pattern_defn = "exclusion:.*"

>>>CRITERIA RECORD: TECH

ATTACHMENT
-21-

VALIDATION RESULTS

```
(fyi) Processing criteria record TPGTECH ...
HI - fpat = "TPGTECH/.*"
HI - run_record = BEC_Verification
HI - run_pattern_defn = "BEC_Verification:.*"
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
Warning. yyparse(): [lineno = 72, linepos = 47]. Could not find property Waiver in run-history
object
BEC_Verification:/tmp_mnt/home/anitak/Work/Projects/qmslite/CriteriaCompiler/aprlite
_sigs:anitak:pixie:767309147:99.
HI - run_record = exclusion
HI - run_pattern_defn = "exclusion:.*"
Warning. yyparse(): No applicable exclusion tool-run for
/tmp_mnt/home/anitak/Work/Projects/qmslite/CriteriaCompiler/data/dir3/TPGTECH/M
MAA, aprsum 208087 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D0, aprsum 101086 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D1, aprsum 202194 in criteria record TPGTECH.
```

ATTACHMENT
-22-

VALIDATION RESULTS

Warning. yyparse(): No applicable exclusion tool-run for
/tmp_mnt/home/anitak/Work/Projects/qmslite/CriteriaCompiler/data/dir4/TPGTECH/WI
D2, aprsum 237998 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D3, aprsum 251140 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D4, aprsum 770744 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D5, aprsum 1167788 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
D9, aprsum 207681 in criteria record TPGTECH.
Warning. yyparse(): No applicable exclusion tool-run for
/tmp_mnt/home/anitak/Work/Projects/qmslite/CriteriaCompiler/data/dir4/TPGTECH/WI
DA, aprsum 1761481 in criteria record TPGTECH.

>>>CRITERIA RECORD: TPGTECH
FILE:
/tmp_mnt/home/anitak/Work/Projects/qmslite/CriteriaCompiler/data/dir3/TPGTECH/M
MAA, aprsum 208087
    Audit Status: PASS using the following rho-ids:
       BEC_Verification:/tmp_mnt/home/anitak/Work/Projects/qmslite/CriteriaCompiler
/aprlite_sigs:anitak:pixie:767309147:99 (evaluated to 1)
    Auxiliary dependents (if any):
FILE:
/tmp_mnt/home/anitak/Work/Projects/qmslite/CriteriaCompiler/data/dir4/TPGTECH/WI
D0, aprsum 101086
    Audit Status: PASS using the following rho-ids:
       BEC_Verification:/tmp_mnt/home/anitak/Work/Projects/qmslite/CriteriaCompiler
/aprlite_sigs:anitak:pixie:767309147:99 (evaluated to 1)
    Auxiliary dependents (if any):
FILE:
/tmp_mnt/home/anitak/Work/Projects/qmslite/CriteriaCompiler/data/dir4/TPGTECH/WI
D1, aprsum 202194
    Audit Status: PASS using the following rho-ids:
       BEC_Verification:/tmp_mnt/home/anitak/Work/Projects/qmslite/CriteriaCompiler
/aprlite_sigs:anitak:pixie:767309147:99 (evaluated to 1)
    Auxiliary dependents (if any):
FILE:
/tmp_mnt/home/anitak/Work/Projects/qmslite/CriteriaCompiler/data/dir4/TPGTECH/WI
D2, aprsum 237998
    Audit Status: PASS using the following rho-ids:
       BEC_Verification:/tmp_mnt/home/anitak/Work/Projects/qmslite/CriteriaCompiler
/aprlite_sigs:anitak:pixie:767309147:99 (evaluated to 1)
    Auxiliary dependents (if any):
FILE:
/tmp_mnt/home/anitak/Work/Projects/qmslite/CriteriaCompiler/data/dir4/TPGTECH/WI
D3, aprsum 251140

ATTACHMENT
-23-

VALIDATION RESULTS

Audit Status: PASS using the following rho-ids:
BEC_Verification:/tmp_mnt/home/anitak/Work/Projects/qmslite/CriteriaCompiler/aprlite_sigs:anitak:pixie:767309147:99 (evaluated to 1)
Auxiliary dependents (if any):

FILE:
/tmp_mnt/home/anitak/Work/Projects/qmslite/CriteriaCompiler/data/dir4/TPGTECH/WID4, aprsum 770744
Audit Status: PASS using the following rho-ids:
BEC_Verification:/tmp_mnt/home/anitak/Work/Projects/qmslite/CriteriaCompiler/aprlite_sigs:anitak:pixie:767309147:99 (evaluated to 1)
Auxiliary dependents (if any):

FILE:
/tmp_mnt/home/anitak/Work/Projects/qmslite/CriteriaCompiler/data/dir4/TPGTECH/WID5, aprsum 1167788
Audit Status: PASS using the following rho-ids:
BEC_Verification:/tmp_mnt/home/anitak/Work/Projects/qmslite/CriteriaCompiler/aprlite_sigs:anitak:pixie:767309147:99 (evaluated to 1)
Auxiliary dependents (if any):

FILE:
/tmp_mnt/home/anitak/Work/Projects/qmslite/CriteriaCompiler/data/dir4/TPGTECH/WID9, aprsum 207681
Audit Status: PASS using the following rho-ids:
BEC_Verification:/tmp_mnt/home/anitak/Work/Projects/qmslite/CriteriaCompiler/aprlite_sigs:anitak:pixie:767309147:99 (evaluated to 1)
Auxiliary dependents (if any):

FILE:
/tmp_mnt/home/anitak/Work/Projects/qmslite/CriteriaCompiler/data/dir4/TPGTECH/WIDA, aprsum 1761481
Audit Status: PASS using the following rho-ids:
BEC_Verification:/tmp_mnt/home/anitak/Work/Projects/qmslite/CriteriaCompiler/aprlite_sigs:anitak:pixie:767309147:99 (evaluated to 1)
Auxiliary dependents (if any):

(fyi) Processing criteria record desblo ...
HI - fpat = "desblo/.*"
HI - run_record = BEC_Verification
HI - run_pattern_defn = "BEC_Verification:.*"
Warning. yyparse(): [lineno = 99, linepos = 47]. Could not find property Waiver in run-history object
BEC_Verification:/tmp_mnt/home/anitak/Work/Projects/qmslite/CriteriaCompiler/aprlite_sigs:anitak:pixie:767309147:99.
HI - run_record = exclusion
HI - run_pattern_defn = "exclusion:.*"
Warning. yyparse(): No applicable exclusion tool-run for
/tmp_mnt/home/anitak/Work/Projects/qmslite/CriteriaCompiler/data/dir4/desblo/wida.dsb, aprsum 1915371 in criteria record desblo.

>>>CRITERIA RECORD: desblo

ATTACHMENT
-24-

VALIDATION RESULTS

FILE:
/tmp_mnt/home/anitak/Work/Projects/qmslite/CriteriaCompiler/data/dir4/desblo/wida.d
sb, aprsum 1915371
    Audit Status: PASS using the following rho-ids:
    BEC_Verification:/tmp_mnt/home/anitak/Work/Projects/qmslite/CriteriaCompiler
/aprlite_sigs:anitak:pixie:767309147:99 (evaluated to 1)
    Auxiliary dependents (if any):

(fyi) Processing criteria record exclusion ...
HI - fpat = "exclusion/.*"
Warning. yyparse(): [lineno = 120, linepos = 29]. No files in buildlist match file pattern
"exclusion/.*".
HI - run_record = exclusion
HI - run_pattern_defn = "exclusion:.*"

>>>CRITERIA RECORD: exclusion (fyi) Processing criteria record gl1 ...
HI - fpat = "gl1/.*"
HI - run_record = lp
HI - run_pattern_defn = "lp:.*"
Warning. yyparse(): [lineno=146, linepos=30]. File
/tmp_mnt/home/anitak/Work/Projects/qmslite/CriteriaCompiler/data/dir4/gl1/wi_wida,
gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0 did not meet sub-criteria for property ExitStatus in tool-
rhoid =
lp:/tmp_mnt/home/anitak/Work/Projects/qmslite/CriteriaCompiler/aprlite_sigs:anitak:pi
xie:778979393:99.
Warning. yyparse(): [lineno = 146, linepos = 47]. Could not find property Waiver in run-history
object
lp:/tmp_mnt/home/anitak/Work/Projects/qmslite/CriteriaCompiler/aprlite_sigs:anitak:pi
xie:778979393:99.
HI - run_record = gr
HI - run_pattern_defn = "gr:.*"
Warning. yyparse(): [lineno = 154, linepos = 47]. Could not find property Waiver in run-history
object
gr:/tmp_mnt/home/anitak/Work/Projects/qmslite/CriteriaCompiler/aprlite_sigs:anitak:pix
ie:778979387:99.
HI - run_record = sm
HI - run_pattern_defn = "sm:.*"
Warning. yyparse(): No applicable sm tool-run for
/tmp_mnt/home/anitak/Work/Projects/qmslite/CriteriaCompiler/data/dir4/gl1/wi_wida,
gl1audit
REAL:wi_wida:3565493603#SYMB:wi_wida:3251399644#REAL:wi_wida_ru012:4291968313#S

ATTACHMENT
-25-

VALIDATION RESULTS

```
YMB:wi_wida_ru012:0#REAL:wi_v1:1643229252#SYMB:wi_v1:0#REAL:wi_wida_xrbreq:363
6692333#SYMB:wi_wida_xrbreq:0 in criteria record gl1.
HI - run_record = bm
HI - run_pattern_defn = "bm:.*"
Warning. yyparse(): [lineno = 166, linepos = 47]. Could not find property Waiver in run-history
object
bm:/tmp_mnt/home/anitak/Work/Projects/qmslite/CriteriaCompiler/aprlite_sigs:anitak:pi
xie:778979381:99.
HI - run_record = exclusion
HI - run_pattern_defn = "exclusion:.*"
Warning. yyparse(): No applicable exclusion tool-run for
/tmp_mnt/home/anitak/Work/Projects/qmslite/CriteriaCompiler/data/dir4/gl1/wi_wida,
gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0 in criteria record gl1.

>>>CRITERIA RECORD: gl1
FILE:
/tmp_mnt/home/anitak/Work/Projects/qmslite/CriteriaCompiler/data/dir4/gl1/wi_wida,
gl1audit
REAL:wi_wida:3565493603#SYMB:wi_wida:3251399644#REAL:wi_wida_ru012:4291968313#S
YMB:wi_wida_ru012:0#REAL:wi_v1:1643229252#SYMB:wi_v1:0#REAL:wi_wida_xrbreq:363
6692333#SYMB:wi_wida_xrbreq:0
        Audit Status: FAIL using the following rho-ids:
        lp:/tmp_mnt/home/anitak/Work/Projects/qmslite/CriteriaCompiler/aprlite_sigs:an
itak:pixie:778979393:99 (evaluated to 0)
        gr:/tmp_mnt/home/anitak/Work/Projects/qmslite/CriteriaCompiler/aprlite_sigs:an
itak:pixie:778979387:99 (evaluated to 1)
        bm:/tmp_mnt/home/anitak/Work/Projects/qmslite/CriteriaCompiler/aprlite_sigs:a
nitak:pixie:778979381:99 (evaluated to 1)

(fyi) Processing criteria record mtv ...
HI - fpat = "mtv/.*"
HI - run_record = FastScan_ATPG
HI - run_pattern_defn = "FastScan_ATPG:.*"
Warning. yyparse(): [lineno = 193, linepos = 47]. Could not find property Waiver in run-history
object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history
object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history
object
FastScan_ATPG:/tmp_mnt/home/anitak/Work/Projects/qmslite/CriteriaCompiler/aprlite_s
igs:anitak:pixie:767308290:99.
```

ATTACHMENT
-26-

VALIDATION RESULTS

Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.
Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s
igs:anitak:pixie:767308290:99.

ATTACHMENT
-27-

VALIDATION RESULTS

Warning. yyparse(): [lineno = 193, linepos = 47]. Could not find property Waiver in run-history object
FastScan_ATPG:/tmp_mnt/home/anitak/Work/Projects/qmslite/CriteriaCompiler/aprlite_s igs:anitak:pixie:767308290:99.
HI - run_record = exclusion
HI - run_pattern_defn = "exclusion:.*"
Warning. yyparse(): No applicable exclusion tool-run for
/tmp_mnt/home/anitak/Work/Projects/qmslite/CriteriaCompiler/data/dir2/mtv/A2.mtv, aprsum 171672 in criteria record mtv.
Warning. yyparse(): No applicable exclusion tool-run for
/tmp_mnt/home/anitak/Work/Projects/qmslite/CriteriaCompiler/data/dir2/mtv/AI2.mtv, aprsum 174037 in criteria record mtv.
Warning. yyparse(): No applicable exclusion tool-run for
/tmp_mnt/home/anitak/Work/Projects/qmslite/CriteriaCompiler/data/dir2/mtv/AI3.mtv, aprsum 182791 in criteria record mtv.
Warning. yyparse(): No applicable exclusion tool-run for
/tmp_mnt/home/anitak/Work/Projects/qmslite/CriteriaCompiler/data/dir2/mtv/AI4.mtv, aprsum 191772 in criteria record mtv.
Warning. yyparse(): No applicable exclusion tool-run for
/tmp_mnt/home/anitak/Work/Projects/qmslite/CriteriaCompiler/data/dir2/mtv/NOT.mtv, aprsum 165680 in criteria record mtv.
Warning. yyparse(): No applicable exclusion tool-run for
/tmp_mnt/home/anitak/Work/Projects/qmslite/CriteriaCompiler/data/dir2/mtv/O2.mtv, aprsum 171722 in criteria record mtv.
Warning. yyparse(): No applicable exclusion tool-run for
/tmp_mnt/home/anitak/Work/Projects/qmslite/CriteriaCompiler/data/dir2/mtv/O3.mtv, aprsum 180417 in criteria record mtv.
Warning. yyparse(): No applicable exclusion tool-run for
/tmp_mnt/home/anitak/Work/Projects/qmslite/CriteriaCompiler/data/dir2/mtv/O4.mtv, aprsum 189340 in criteria record mtv.
Warning. yyparse(): No applicable exclusion tool-run for
/tmp_mnt/home/anitak/Work/Projects/qmslite/CriteriaCompiler/data/dir3/mtv/inv.mtv, aprsum 201271 in criteria record mtv.
Warning. yyparse(): No applicable exclusion tool-run for
/tmp_mnt/home/anitak/Work/Projects/qmslite/CriteriaCompiler/data/dir4/mtv/wi_wida.mtv, aprsum 1046710 in criteria record mtv.
Warning. yyparse(): No applicable exclusion tool-run for
/tmp_mnt/home/anitak/Work/Projects/qmslite/CriteriaCompiler/data/dir4/mtv/wi_wida_bufs.mtv, aprsum 1411349 in criteria record mtv.
Warning. yyparse(): No applicable exclusion tool-run for
/tmp_mnt/home/anitak/Work/Projects/qmslite/CriteriaCompiler/data/dir4/mtv/wi_wida_rtnrureq.mtv, aprsum 75844 in criteria record mtv.
Warning. yyparse(): No applicable exclusion tool-run for
/tmp_mnt/home/anitak/Work/Projects/qmslite/CriteriaCompiler/data/dir4/mtv/wi_wida_rtorrureq.mtv, aprsum 170918 in criteria record mtv.
Warning. yyparse(): No applicable exclusion tool-run for
/tmp_mnt/home/anitak/Work/Projects/qmslite/CriteriaCompiler/data/dir4/mtv/wi_wida_rtreq.mtv, aprsum 174796 in criteria record mtv.
Warning. yyparse(): No applicable exclusion tool-run for
/tmp_mnt/home/anitak/Work/Projects/qmslite/CriteriaCompiler/data/dir4/mtv/wi_wida_ru012.mtv, aprsum 303750 in criteria record mtv.

ATTACHMENT
-28-

VALIDATION RESULTS

Warning. yyparse(): No applicable exclusion tool-run for /tmp_mnt/home/anitak/Work/Projects/qmslite/CriteriaCompiler/data/dir4/mtv/wi_wida_rureq.mtv, aprsum 155104 in criteria record mtv.

Warning. yyparse(): No applicable exclusion tool-run for /tmp_mnt/home/anitak/Work/Projects/qmslite/CriteriaCompiler/data/dir4/mtv/wi_wida_xrbreq.mtv, aprsum 592417 in criteria record mtv.

```
>>>CRITERIA RECORD: mtv
FILE:
/tmp_mnt/home/anitak/Work/Projects/qmslite/CriteriaCompiler/data/dir2/mtv/A2.mtv,
aprsum 171672
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
FILE:
/tmp_mnt/home/anitak/Work/Projects/qmslite/CriteriaCompiler/data/dir2/mtv/AI2.mtv,
aprsum 174037
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
FILE:
/tmp_mnt/home/anitak/Work/Projects/qmslite/CriteriaCompiler/data/dir2/mtv/AI3.mtv,
aprsum 182791
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
FILE:
/tmp_mnt/home/anitak/Work/Projects/qmslite/CriteriaCompiler/data/dir2/mtv/AI4.mtv,
aprsum 191772
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
FILE:
/tmp_mnt/home/anitak/Work/Projects/qmslite/CriteriaCompiler/data/dir2/mtv/NOT.mtv
, aprsum 165680
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
FILE:
/tmp_mnt/home/anitak/Work/Projects/qmslite/CriteriaCompiler/data/dir2/mtv/O2.mtv,
aprsum 171722
        Audit Status: PASS using the following rho-ids:
        FastScan_ATPG:/tmp_mnt/home/anitak/Work/Projects/qmslite/CriteriaCompiler/a
prlite_sigs:anitak:pixie:767308290:99 (evaluated to 1)
        Auxiliary dependents (if any):
```

ATTACHMENT
-29-

VALIDATION RESULTS

FILE:
/tmp_mnt/home/anitak/Work/Projects/qmslite/CriteriaCompiler/data/dir2/mtv/O3.mtv, aprsum 180417
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir2/mtv/O4.mtv, aprsum 189340
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir3/mtv/inv.mtv, aprsum 201271
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir4/mtv/wi_wida.mtv, aprsum 1046710
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir4/mtv/wi_wida_bufs.mtv, aprsum 1411349
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir4/mtv/wi_wida_rtnrureq.mtv, aprsum 75844
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir4/mtv/wi_wida_rtorrureq.mtv, aprsum 170918
    Audit Status: PASS using the following rho-ids:
    FastScan_ATPG:/tmp_mnt/home/anitak/Work/Projects/qmslite/CriteriaCompiler/a prlite_sigs:anitak:pixie:767308290:99 (evaluated to 1)
    Auxiliary dependents (if any):

FILE:
/tmp_mnt/home/anitak/Work/Projects/qmslite/CriteriaCompiler/data/dir4/mtv/wi_wida_rtreq.mtv, aprsum 174796

ATTACHMENT
-30-

VALIDATION RESULTS

Audit Status: PASS using the following rho-ids:
FastScan_ATPG:/tmp_mnt/home/anitak/Work/Projects/qmslite/CriteriaCompiler/aprlite_sigs:anitak:pixie:767308290:99 (evaluated to 1)
Auxiliary dependents (if any):

FILE:
/tmp_mnt/home/anitak/Work/Projects/qmslite/CriteriaCompiler/data/dir4/mtv/wi_wida_ru012.mtv, aprsum 303750
Audit Status: PASS using the following rho-ids:
FastScan_ATPG:/tmp_mnt/home/anitak/Work/Projects/qmslite/CriteriaCompiler/aprlite_sigs:anitak:pixie:767308290:99 (evaluated to 1)
Auxiliary dependents (if any):

FILE:
/tmp_mnt/home/anitak/Work/Projects/qmslite/CriteriaCompiler/data/dir4/mtv/wi_wida_rureq.mtv, aprsum 155104
Audit Status: PASS using the following rho-ids:
FastScan_ATPG:/tmp_mnt/home/anitak/Work/Projects/qmslite/CriteriaCompiler/aprlite_sigs:anitak:pixie:767308290:99 (evaluated to 1)
Auxiliary dependents (if any):

FILE:
/tmp_mnt/home/anitak/Work/Projects/qmslite/CriteriaCompiler/data/dir4/mtv/wi_wida_xrbreq.mtv, aprsum 592417
Audit Status: PASS using the following rho-ids:
FastScan_ATPG:/tmp_mnt/home/anitak/Work/Projects/qmslite/CriteriaCompiler/aprlite_sigs:anitak:pixie:767308290:99 (evaluated to 1)
Auxiliary dependents (if any):

(fyi) Processing criteria record time ...
HI - fpat = "time/.*"
HI - run_record = ETE_COVERAGE_CHECK
HI - run_pattern_defn = "ETE_COVERAGE_CHECK:.*"
Warning. yyparse(): [lineno = 224, linepos = 47]. Could not find property Waiver in run-history object
ETE_COVERAGE_CHECK:/tmp_mnt/home/anitak/Work/Projects/qmslite/CriteriaCompiler/aprlite_sigs:anitak:pixie:767403060:99.
HI - run_record = ETE_SEMANTIC_CHECK
HI - run_pattern_defn = "ETE_SEMANTIC_CHECK:.*"
Warning. yyparse(): [lineno = 230, linepos = 47]. Could not find property Waiver in run-history object
ETE_SEMANTIC_CHECK:/tmp_mnt/home/anitak/Work/Projects/qmslite/CriteriaCompiler/aprlite_sigs:anitak:pixie:767403055:99.
HI - run_record = exclusion
HI - run_pattern_defn = "exclusion:.*"
Warning. yyparse(): No applicable exclusion tool-run for /tmp_mnt/home/anitak/Work/Projects/qmslite/CriteriaCompiler/data/dir4/time/WIDA.etter, aprsum 1113512 in criteria record time.

>>>CRITERIA RECORD: time

ATTACHMENT
-31-

VALIDATION RESULTS

FILE:
/tmp_mnt/home/anitak/Work/Projects/qmslite/CriteriaCompiler/data/dir4/time/WIDA.eter, aprsum 1113512

Audit Status: PASS using the following rho-ids:
ETE_COVERAGE_CHECK:/tmp_mnt/home/anitak/Work/Projects/qmslite/CriteriaCompiler/aprlite_sigs:anitak:pixie:767403060:99 (evaluated to 1)
ETE_SEMANTIC_CHECK:/tmp_mnt/home/anitak/Work/Projects/qmslite/CriteriaCompiler/aprlite_sigs:anitak:pixie:767403055:99 (evaluated to 1)
Auxiliary dependents (if any):

(fyi) Processing criteria record verilog_switch ...
HI - fpat = "verilog_switch/.*"
HI - run_record = Verilog_ATPG
HI - run_pattern_defn = "Verilog_ATPG:.*"
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
Warning. yyparse(): [lineno = 259, linepos = 47]. Could not find property Waiver in run-history object
Verilog_ATPG:/tmp_mnt/home/anitak/Work/Projects/qmslite/CriteriaCompiler/aprlite_sigs:anitak:pixie:767381256:99.
HI - run_record = exclusion
HI - run_pattern_defn = "exclusion:.*"

ATTACHMENT
-32-

VALIDATION RESULTS

Warning. yyparse(): No applicable exclusion tool-run for /tmp_mnt/home/anitak/Work/Projects/qmslite/CriteriaCompiler/data/dir4/verilog_switch/wi_wida.v, aprsum 540223 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_bufs.v, aprsum 150035 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_rtnrureq.v, aprsum 82798 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_rtorrureq.v, aprsum 82021 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_rtreq.v, aprsum 182800 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_ru012.v, aprsum 82012 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_rureq.v, aprsum 121957 in criteria record verilog_switch.

Warning. yyparse(): No applicable exclusion tool-run for /tmp_mnt/home/anitak/Work/Projects/qmslite/CriteriaCompiler/data/dir4/verilog_switch/wi_wida_xrbreq.v, aprsum 15296 in criteria record verilog_switch.

>>>CRITERIA RECORD: verilog_switch
FILE:
/tmp_mnt/home/anitak/Work/Projects/qmslite/CriteriaCompiler/data/dir4/verilog_switch/wi_wida.v, aprsum 540223
    Audit Status: PASS using the following rho-ids:
        Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):

FILE:
/tmp_mnt/home/anitak/Work/Projects/qmslite/CriteriaCompiler/data/dir4/verilog_switch/wi_wida_bufs.v, aprsum 150035
    Audit Status: PASS using the following rho-ids:
        Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):

FILE:
/tmp_mnt/home/anitak/Work/Projects/qmslite/CriteriaCompiler/data/dir4/verilog_switch/wi_wida_rtnrureq.v, aprsum 82798
    Audit Status: PASS using the following rho-ids:
        Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):

FILE:
/tmp_mnt/home/anitak/Work/Projects/qmslite/CriteriaCompiler/data/dir4/verilog_switch/wi_wida_rtorrureq.v, aprsum 82021
    Audit Status: PASS using the following rho-ids:

ATTACHMENT
-33-

VALIDATION RESULTS

Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):
FILE:
/tmp_mnt/home/anitak/Work/Projects/qmslite/CriteriaCompiler/data/dir4/verilog_switch/wi_wida_rtreq.v, aprsum 182800
    Audit Status: PASS using the following rho-ids:
    Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):
FILE:
/tmp_mnt/home/anitak/Work/Projects/qmslite/CriteriaCompiler/data/dir4/verilog_switch/wi_wida_ru012.v, aprsum 82012
    Audit Status: PASS using the following rho-ids:
    Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):
FILE:
/tmp_mnt/home/anitak/Work/Projects/qmslite/CriteriaCompiler/data/dir4/verilog_switch/wi_wida_rureq.v, aprsum 121957
    Audit Status: PASS using the following rho-ids:
    Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):
FILE:
/tmp_mnt/home/anitak/Work/Projects/qmslite/CriteriaCompiler/data/dir4/verilog_switch/wi_wida_xrbreq.v, aprsum 15296
    Audit Status: PASS using the following rho-ids:
    Verilog_ATPG:/tmp_mnt/home/anitak/Work/Projects/qmslite/CriteriaCompiler/aprlite_sigs:anitak:pixie:767381256:99 (evaluated to 1)
    Auxiliary dependents (if any):

Post-processing...(No news is good news)

All done.

ATTACHMENT
-34- tracer.c

```c
#include <stdio.h>
#include "definitions.h"

main(int argc, char *argv[]) {
int i, pid;
char cmd[MAX];
FILE *fopen(), *fd, *fd2;
char pid_string[MAX];
char *cwd;
char fname[MAX], absfname[MAX], access_mode[MAX];
/*
Use this program to invoke another program whose run-time
dependencies it is desired to log. This program acts as
a wrapper through which the program to monitor gets called.
The wrapper turns on trace collection prior to execution of
the program to be monitored, and turns off trace collection
after the monitored program has completed execution. This
program outputs the name* of all files accessed by the monitored
program during run-time, including files accessed by forked and
child processes.

* NOTE: The version number and/or checksum can also be output.
*/
pid = getpid();
cwd = (char *)malloc(MAX);
cwd = getcwd(cwd, MAX);

if (argc > 1) {
        /* configure trace */ sprintf(cmd, "-j 106,107,130,134,139,15b -ad -o /tmp/trace.log.%d; ", pid);

if (trcstart(cmd)) {
          perror("trcstart");
          printf("[%s]. (fyi) Going to try stopping trace and re-starting.\n", argv[0]);
          if (trcstop(0)) {
            perror("trcstop");
            printf("[%s]. (fyi) Didn't work. Exiting.\n", argv[0]);
            exit(ERROR);
          }
          else {
            system("sleep 1"); /* allow time for trcstop to really work */
            if (trcstart(cmd)) {
              perror("trcstart");
            printf("[%s]. (fyi) Didn't work. Exiting.\n", argv[0]);
              exit(ERROR);
        }
          else {
            printf("[%s]. (fyi) Trace stop and re-start successful. Continuing.\n", argv[0]);
          }
        }
      }
```

ATTACHMENT
-35- tracer.c

```c
/* make command to run monitored program */
cmd[0]='\0';
for (i = 1; i < argc; i++) {
        sprintf(cmd, "%s %s", cmd, argv[i]);
}

/* start trace */ if (trcon(0)) {
  perror("trcon");
  exit(ERROR);
}
        /* execute command to run monitored program */ system(cmd);

/* stop trace */ if (trcstop(0)) {
          perror("trcstop");
          exit(ERROR);
        }
/* get pid's associated with the execution of this command, (and the names of executables called)
*/
        sprintf(cmd, "trcrpt -h -d 107,134,139 /tmp/trace.log.%d | %s/pid_filter /tmp/trace.pid. "
                "%d /tmp/tracer.out.execs.%d %s",
                pid, TRACER_LOC, pid, pid, cwd);
        system(cmd);

/* get names and access mode of files opened by the execution of this command */ sprintf(cmd, "/tmp/trace.pid.%d", pid);
        if ((fd = fopen(cmd, "r")) == NULL) { /* open file containing relevant pid's */
                perror("fopen");
        }
        else {
                fscanf(fd, "%s\n", pid_string); /* get relevant pid's */
                fclose(fd);
                pid_string[strlen(pid_string)-1] = '\0'; /* get rid of last comma in pid_string */
                sprintf(cmd, "trcrpt -h -d 15b -p %s /tmp/trace.log.%d | awk '[fdata =$5\" \"$7; "
                        " print fdata}' | sort | uniq > /tmp/tracer.tmp.fopened.%d",
                        pid_string, pid, pid);
                /* get names and access mode of files opened by the execution of this command */
                system(cmd);

/* make all filenames in tracer.tmp.fopened absolute */ sprintf(cmd, "/tmp/tracer.tmp.fopened.%d", pid);
                if ((fd = fopen(cmd, "r")) == NULL)
                { /* tmp file containing filenames that have been opened for r/w */
                        perror("fopen");
```

ATTACHMENT
-36- tracer.c

```
        }
        else {
                sprintf(cmd, "/tmp/tracer.out.fopened.%d", pid);
                if ((fd2 = fopen(cmd, "w")) == NULL) {
                        perror("fopen");
                }
                else {
                        while (fscanf(fd, "%s %s\n", fname, access_mode) != EOF) {
                                if (fname[0] != '/') {
                                        sprintf(absfname, "%s/%s", cwd, fname);
                                        /* output absolute filename and access mode */
                                        fprintf(fd2, "%s %s\n", absfname, access_mode);
                                        /* LATER -
                                           output version number and/or checksum, too */
                                }
                                else {
                                        /* output absolute filename and access mode*/
                                        fprintf(fd2, "%s %s\n", fname, access_mode);
                                        /* LATER -
                                           output version number and/or checksum, too */
                                }
                        } /* while (!EOF) */
                        fclose(fd2);
                } /* else */
                fclose(fd);
        } /* else */
        /* clean up */ sprintf(cmd,
                "rm /tmp/trace.log.%d; rm /tmp/trace.pid.%d; rm /tmp/tracer.tmp.fopened.%d",
                pid, pid, pid);
        system(cmd);

/* print results */ sprintf(cmd,
                "echo FILES OPENED:; cat /tmp/tracer.out.fopened.%d "
                "echo EXECUTABLES CALLED:; cat /tmp/tracer.out.execs.%d",
                pid, pid);
        system(cmd);
    }
}
else {
        printf("[%s]. Wanna do something?\n", argv[0]);
}
} /* main() */
```

ATTACHMENT
-37- tokens.l

```
%{
FILE *fopen(), *fd_pids, *fd_execs;
int pidvalue = 0;
char lookfor_exec[1000];
char *cwd;
%}
%%
[\t ]+              /* ignore whitespace */    ;
pid=[0-9]+          /* PID */                  {
                                                   pidvalue = atoi(yytext+4);
                                               }
lookuppn:[ ].+      /* LOOKUPPN */             {
                                                   strcpy(lookfor_exec, yytext + 10);
                                               }
exec[ ]bsh          /* EXEC BSH */             ;
exec[ ]trcstop      /* EXEC TRCSTOP */         ;
exec[ ][/a-zA-Z0-9]+ /* EXEC FNAME */          {
                                                   if (lookfor_exec[0] == '/') {
                                                       fprintf(fd_execs, "%s\n",
                                                           lookfor_exec);
                                                   }
                                                   else {
                                                       if (lookfor_exec[0] == '.') {
                                                           fprintf(fd_execs,
                                                   "%s%s\n", cwd, &lookfor_exec[1]);
                                                       }
                                                       else {
                                                           fprintf(fd_execs,
                                                   "%s/%s\n", cwd, lookfor_exec);
                                                       }
                                                   }
                                                   fprintf(fd_pids, "%d,", pidvalue);
                                               }
.\n                 /* ignore token */         ;
%%
main(int argc, char *argv[]) {
        if ((fd_pids = fopen(argv[1], "w")) == NULL) {
                perror("fopen -- ");
        }
        if ((fd_execs = fopen(argv[2], "w")) == NULL) {
                perror("fopen -- ");
        }
        cwd = argv[3];
        yylex();
        fprintf(fd_pids, "\n");
        fclose(fd_pids);
        fclose(fd_execs);
}
```

ATTACHMENT
-38- definitions.h / Makefile

>>> definitions.h

```
#define ERROR        -1
#define MAX          1000
#define TRACER_LOC   "/home/tools/anitak/Work/Projects/APR/Wrapper/Trace"
```

>>> Makefile (for wrapper run-history collector)

```
tracer : tracer.c
        cc -o tracer tracer.c -lrts pid_filter : tokens.l
        lex tokens.l
        cc -o pid_filter lex.yy.c -ll
        rm lex.yy.c
```

I claim:

1. A method for automatically determining a run-time environment of a computer program, said method comprising the steps of:
   A) turning on a system tracing of one or more event types;
   B) executing the computer program on a Computer Processor while tracing the one or more event types after turning on the system tracing;
   C) turning off the system tracing of the one or more event types after executing the computer program; and
   D) searching a system trace output resulting from the system tracing of the one or more event types to identify events corresponding to the execution of the computer program.

2. The method in claim 1 wherein step (D) comprises:
   1) determining one or more Process IDs (PIDs) corresponding to the execution of the computer program;
   2) searching the system trace output for one or more selected events corresponding to the PIDs determined in substep (1).

3. The method in claim 2 wherein step (D) substep (1) comprises:
   (a) inserting an initial Process Id (PID) in a PID list,
   (b) searching the system trace output for a process initiation event,
   (c) whenever the process initiation event is found in the system trace output, matching an initiating PID in the process initiation events with one of the PIDs in the PID list, and
   (d) whenever the initiating PID is matched in subsubstep (c), inserting a corresponding initiated PID in the PID list.

4. The method in claim 3 wherein in step (D) substep (1) substep (d):
   the process initiation event is the execution of a "fork" system command.

5. The method in claim 2 wherein in step (D) substep (2):
   at least one of the selected event types corresponds to a "fork" system command.

6. The method in claim 2 wherein in step (D) substep (2):
   at least one of the selected event types corresponds to an "exec" system command.

7. The method in claim 2 wherein in step (D) substep (2):
   at least one of the selected event types corresponds to an opening of a file.

8. A method for recording Run History file entries utilizing the method in claim 1 which further comprises:
   E) formatting a Run History File entry from the events identified in step (D), and
   F) writing the Run History File entry in a Run History File.

9. The method in claim 8 wherein in step (E):
   the Run History File entry includes an exit status from the program executed in step (b).

10. The method in claim 8 wherein in step (E):
    the Run History File entry includes a pathname of the program executed in step (b).

11. The method in claim 8 wherein in step (E):
    the Run History File entry includes one or more command line parameters to the program executed in step (B).

12. The method in claim 8 wherein in step (E):
    the Run History File entry includes the pathnames of one or more files opened by the program executed in step (B).

13. The method in claim 12 wherein:
    each of the one or more patinames for the files included in the Run History File entry is identified with a unique identification to distinguish it from different versions of the file.

14. The method in claim 13 wherein:
    the unique identification is a checksum.

15. The method in claim 13 wherein:
    the unique identification is a version number.

16. The method in claim 12 wherein:
    the Run History File entry includes a file access mode for each of the one or more pathnames corresponding to the files opened by the program executed in step (B).

17. The method in claim 8 wherein in step (E):
    the Run History File entry includes an identification uniquely identifying the execution of the program executed in step (B).

18. The method in claim 8 wherein in step (F):
    the Run History File is stored as a flat file on Secondary Storage.

19. The method in claim 8 wherein in step (F):
    the Run History File is stored as a database on Secondary Storage.

20. A method for automatically recording Run History file entries corresponding to a run-time environment of a computer program, said method comprising the steps of:
    A) turning on a system tracing of one or more event types;
    B) executing the computer program on a Computer Processor while system tracing the one or more event types after the system tracing is turned on in step (A);
    C) turning off the system tracing of the one or more event types after executing the computer program;
    D) searching a trace output resulting from the system tracing of the one or more event types to identify events corresponding to the execution of the computer program, said step comprising the substeps of:
       1) determining one or more Process IDs (PIDs) corresponding to the execution of the computer program, said substep comprising the substeps of:
          (a) inserting an initial Process Id (PID) in a PID list,
          (b) searching the system trace output for a process initiation event,
          (c) whenever the process initiation event is found in the system trace output, matching an initiating PID in the process initiation event with one of the PIDs in the PID list, and
          (d) whenever the initiating PID is matched, inserting a corresponding initiated PID in the PID list, and
       2) searching the system trace output for one or more selected events corresponding to the PIDs determined in substep (1);
    E) formatting a Run History File entry from the events identified in step (D); and
    F) writing the Run History File entry in a Run History File stored on Secondary Storage.

21. A wrapper computer program for automatically determining a run-time environment of an object computer program comprising:
    A) a program element for turning on a system tracing of one or more event types;
    B) a program element for executing the object computer program on a Computer Processor while system tracing the one or more event types after the system tracing is turned on;

C) a program element for turning off the system tracing of the one or more event types after executing the object computer program; and D) a program element for searching a system trace output resulting from the system tracing of one or more event types to identify events corresponding to the execution of the object computer program.

22. The program in claim 21 wherein program element (D) comprises:

1) a program element for identifying one or more Process Ids (PIDs) corresponding to the execution of the object computer program;

2) a program element for searching the trace output for one or more selected events corresponding to the PIDs identified in program element (1).

23. The program in claim 22 wherein program element (D) subelement (1) comprises:

(a) a program element for inserting an initial Process Id (PID) in a PID list, (b) a program element for searching the trace output for process initiation events, (c) a program element for matching an initiating PID in the process initiation events with one of the PIDs in the PID list whenever a process initiation event is found in the trace output, and (d) a program element for inserting a corresponding initiated PID in the PID list whenever an initiating PID is matched.

24. The wrapper program in claim 23 wherein in program element (D) subelement (1) subelement (d):

the process initiation event is the execution of a "fork" system command.

25. The wrapper program in claim 22 Wherein in program element (D) subelement (2):

at least one of the selected event types corresponds to a "fork" system command.

26. The wrapper program in claim 22 wherein in program element (D) subelement (2):

at least one of the selected event types corresponds to an "exec" system command.

27. The wrapper program in claim 22 wherein in program element (D) subelement (2):

at least one of the selected event types corresponds to an opening of a file.

28. A wrapper computer program for automatically recording Run History File entries utilizing the program elements in claim 21 which further comprises:

E) a program element for formatting a Run History File entry from the events identified in program element (D), and F) a program element for writing the Run History File entry in a Run History File.

29. The wrapper program in claim 28 wherein the Run History File is stored as a flat file on Secondary Storage.

30. A wrapper computer program for automatically recording Run History file entries corresponding to a runtime environment of an object computer program comprising:

A) a program element for turning on a system tracing of one or more event types;

B) a program element for executing the object computer program on a Computer Processor while system tracing the one or more event types;

C) a program element for turning off the system tracing of the one or more event types after executing the computer program;

D) a program element for searching a system trace output resulting from the system tracing of the one or more event types to identify events corresponding to the execution of the object computer program, said program element comprising:

1) a program element for determining one or more Process IDs (PIDs) corresponding to the execution of the object computer program, said program element comprising:

(a) a program element for inserting an initial PID in a PID list, (b) a program element for searching the system trace output for process initiation events, (c) a program element for matching an initiating PID in the process initiation events with one of the PIDs in the PID list whenever a process initiation event is found in the system trace output, and (d) a program element for inserting a corresponding initiated PID in the PID list whenever an initiating PID is matched, and 2) a program element for searching the system trace output for one or more selected events corresponding to the PIDs determined in program element (1);

E) a program element for formatting a Run History File entry from the events identified in program element (D); and F) a program element for writing the Run History File entry formatted by program element (E) in a Run History File stored on Secondary Storage.

* * * * *